United States Patent Office 3,465,003
Patented Sept. 2, 1969

3,465,003
4H-BENZO[4,5]CYCLOHEPTA[1,2-b]THIOPHENE DERIVATIVES
Ernst Jucker, Ettingen, Anton Ebnother, Reinach, Basel-Land, Jean-Michel Bastian, Birsfelden, Erwin Rissi, Basel, and André Stoll, Birsfelden, Switzerland, assignors to Sandoz Ltd. (also known as Sandoz A.G.), Basel, Switzerland
No Drawing. Continuation-in-part of applications Ser. No. 385,072, July 24, 1964, Ser. No. 418,562 and Ser. No. 418,564, Dec. 15, 1964, and Ser. No. 459,458, May 27, 1965. This application Sept. 15, 1967, Ser. No. 668,212
Claims priority, application Switzerland, July 29, 1963, 9,418/63; Dec. 20, 1963, 15,707/63, 15,711/63, 15,712/63; May 22, 1964, 6,699/64; May 26, 1964, 6,858/64; June 17, 1964, 7,895/64; Oct. 12, 1964, 13,202/64
Int. Cl. C07d 63/18; A61k 27/00
U.S. Cl. 260—329      6 Claims

ABSTRACT OF THE DISCLOSURE

A compound of the formula:

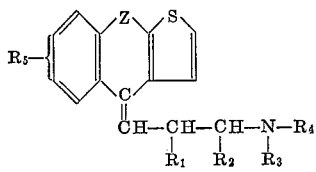

wherein
Either each of $R_1$ and $R_2$ are hydrogen or alkyl of 1 to 4 carbon atoms, each of $R_3$ and $R_4$ are alkyl of 1 to 4 carbon atoms or $R_3$ and $R_4$ are together tetramethylene or pentamethylene, or $R_1$ is hydrogen, $R_2$ and $R_3$ are together trimethylene or tetramethylene and $R_4$ is alkyl of 1 to 4 carbon atoms, or $R_1$ together with $R_3$ is dimethylene or trimethylene, $R_2$ is hydrogen and $R_4$ is alkyl of 1 to 4 carbon atoms, $R_5$ is hydrogen, and Z is

—CH$_2$—CH$_2$—

Or each of $R_1$, $R_2$ and $R_5$ are hydrogen, each of $R_3$ and $R_4$ are alkyl of 1 to 4 carbon atoms, or $R_1$ is hydrogen, $R_2$ and $R_4$ are together trimethylene or tetramethylene and $R_3$ is alkyl of 1 to 4 carbon atoms, and Z is

—CH=CH—

Or each of $R_1$ and $R_2$ are hydrogen or methyl, each of $R_3$ and $R_4$ are alkyl of 1 to 4 carbon atoms or $R_3$, $R_4$ and the nitrogen atom are together pyrrolidine, piperidine piperazine, 4-methyl-piperazine or 4-hydroxyalkyl(2 to 3 carbon atoms)-piperazine, or $R_1$ and $R_3$ are together dimethylene or trimethylene, $R_2$ is hydrogen and $R_4$ is alkyl of 1 to 4 carbon atoms, or $R_1$ is hydrogen, $R_2$ and $R_3$ are together trimethylene or tetramethylene and $R_4$ is alkyl of 1 to 4 carbon atoms, $R_5$ is chlorine, bromine or alkoxy of 1 to 4 carbon atoms, and Z is —CH$_2$CH$_2$— or

—CH=CH—

Or each of $R_1$, $R_2$ and $R_5$ are hydrogen, and $R_3$, $R_4$ and the nitrogen atoms are together morpholine, piperazine, 4-hydroxy-piperidine, 4-alkyl(1 to 3 carbon atoms)-piperazine or 4-hydroxy-alkyl(2 to 3 carbon atoms)-piperazine, and Z is —CH$_2$—CH$_2$— or —CH=CH—, and a pharmaceutically acceptable acid addition salt thereof.

The compounds have sedative and neuroleptic properties, and are indicated for use in the treatment of psychic illnesses.

This invention is a consolidation of continuation-in-part applications Serial Nos. 385,072 filed July 24, 1964; 418,562 filed Dec. 15, 1964; 418,564 filed Dec. 15, 1964; and 459,458 filed May 27, 1965, all now abandoned.

This invention relates to 4H-benzo[4,5]cyclohepta[1,2-b]thiophene derivatives, and more specifically to a compound of Formula I:

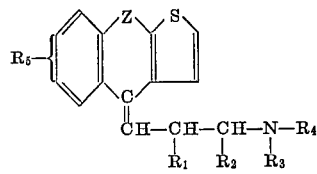

wherein
Either each of $R_1$ and $R_2$ are hydrogen or alkyl of 1 to 4 carbon atoms, each of $R_3$ and $R_4$ are alkyl of 1 to 4 carbon atoms or $R_3$ and $R_4$ are together tetramethylene or pentamethylene, or $R_1$ is hydrogen, $R_2$ and $R_3$ are together trimethylene or tetramethylene and $R_4$ is alkyl of 1 to 4 carbon atoms, or $R_1$ together with $R_3$ is dimethylene or trimethylene, $R_2$ is hydrogen and $R_4$ is alkyl of 1 to 4 carbon atoms, $R_5$ is hydrogen, and Z is —CH$_2$—CH$_2$—;

Or each of $R_1$, $R_2$ and $R_5$ are hydrogen, each of $R_3$ and $R_4$ are alkyl of 1 to 4 carbon atoms, or $R_1$ is hydrogen, $R_2$ and $R_4$ are together trimethylene or tetramethylene and $R_3$ is alkyl of 1 to 4 carbon atoms, and Z is

—CH=CH—

Or each of $R_1$ and $R_2$ are hydrogen or methyl, each of $R_3$ and $R_4$ are alkyl of 1 to 4 carbon atoms or $R_3$, $R_4$ and the nitrogen atom are together pyrrolidine, piperidine, piperazine, 4-methyl-piperazine or 4-hydroxy-alkyl(2 to 3 carbon atoms)-piperazine, or $R_1$ and $R_3$ are together dimethylene or trimethylene, $R_2$ is hydrogen and $R_4$ is alkyl of 1 to 4 carbon atoms, or $R_1$ is hydrogen, $R_2$ and $R_3$ are together trimethylene or tetramethylene and $R_4$ is alkyl of 1 to 4 carbon atoms, $R_5$ is chlorine, bromine or alkoxy of 1 to 4 carbon atoms, and Z is —CH$_2$—CH$_2$— or —CH=CH—;

Or each of $R_1$, $R_2$ and $R_5$ are hydrogen, and $R_3$, $R_4$ and the nitrogen atom are together morpholine, piperazine, 4-hydroxy-piperidine, 4-alkyl(1 to 3 carbon atoms)-piperazine or 4-hydroxy-alkyl(2 to 3 carbon atoms)-piperazine, and Z is —CH$_2$—CH$_2$— or —CH=CH—, and a pharmaceutically acceptable acid addition salt thereof.

The present invention further provides processes for the production of a compound of Formula I and an acid addition salt thereof. Thus:

(a) A compound of the Formula Ia:

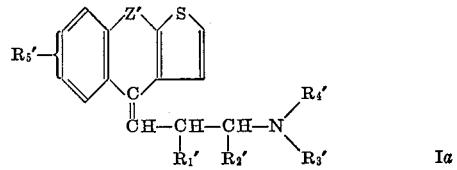

wherein
Either each of $R_1'$ and $R_2'$ are hydrogen or alkyl of 1 to 4 carbon atoms, each of $R_3'$ and $R_4'$ are alkyl of 1 to 4 carbon atoms or $R_3'$ and $R_4'$ are together tetramethylene or pentamethylene, or $R_1'$ is hydrogen, $R_2'$ and $R_3'$ are together trimethylene or tetramethylene and $R_4'$ is alkyl of 1 to 4 carbon atoms, or $R_1'$ together with $R_3'$ is dimethylene or trimethylene, $R_2'$ is hydrogen and $R_4'$ is alkyl of 1 to 4 carbon atoms, $R_5'$ is hydrogen, and Z' is —CH$_2$—CH$_2$—;

Or each of $R_1'$, $R_2'$ and $R_5'$ are hydrogen, each of $R_3'$ and $R_4'$ are alkyl of 1 to 4 carbon atoms, or $R_1'$ is hydrogen, $R_2'$ and $R_4'$ are together trimethylene or tetramethylene and $R_3'$ is alkyl of 1 to 4 carbon atoms, and Z' is —CH=CH—;

Or each of $R_1'$ and $R_2'$ are hydrogen or methyl, each of $R_3'$ and $R_4'$ are alkyl of 1 to 4 carbon atoms or $R_3'$, $R_4'$ and the nitrogen atom are together pyrrolidine, piperidine, 4-methyl-piperazine, or $R_1'$ and $R_3'$ are together dimethylene or trimethylene, $R_2'$ is hydrogen and $R_4'$ is alkyl of 1 to 4 carbon atoms, or $R_1'$ is hydrogen, $R_2'$ and $R_3'$ are together trimethylene or tetramethylene and $R_4'$ is alkyl of 1 to 4 carbon atoms, $R_5'$ is chlorine, bromine or alkoxy of 1 to 4 carbon atoms, and $Z'$ is —CH$_2$—CH$_2$— or —CH=CH—;

Or each of $R_1'$, $R_2'$ and $R_5'$ are hydrogen, and $R_3'$, $R_4'$ and the nitrogen atom are together morpholine or 4-alkyl (1 to 3 carbon atoms)-piperazine, and $Z'$ is —CH$_2$CH$_2$— or —CH=CH—, is produced by splitting off the elements of water from a compound of Formula II:

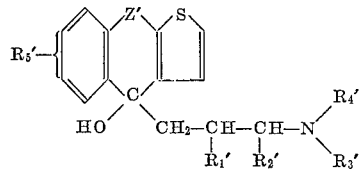

wherein $R_1'$ to $R_5$ and $Z'$ have the above significance;

(b) A compound of the Formula Ib,

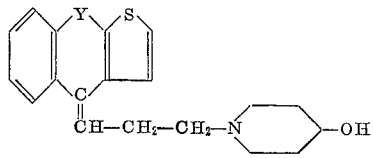

wherein Y is —CH$_2$CH$_2$— or —CH=CH—, is produced by splitting off the elements of water from a compound of Formula IIb:

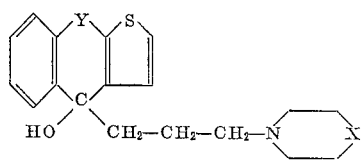

wherein Y has the above significance and X is a ketalized carbonyl radical which is simultaneously deketalized to the carbonyl radical, and reducing the resulting compound with a complex metal hydride in an inert solvent;

(c) A compound of Formula Ic:

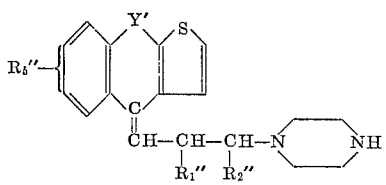

wherein each of $R_1''$ and $R_2''$ are hydrogen or methyl, $R_5''$ is hydrogen, chlorine, bromine or alkoxy, and $Y'$ is —CH$_2$CH$_2$— or —CH=CH—, is produced by treating the corresponding 4-methyl-piperazine obtained by the above process (a), with a chloroformic acid lower alkyl ester, and hydrolytically splitting off the alkoxy radical from the resulting 4-carbalkoxy-piperazinyl compound;

(d) A compound of Formula Id:

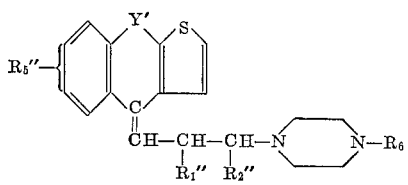

wherein $R_1''$, $R_2''$, $R_5''$ and $Y'$ have the above significance, and $R_6$ is a hydroxyalkyl group of 2 to 3 carbon atoms, is produced by reacting the compound of Formula Ic obtained by the above process (c) with ethylene oxide, pro- pylene oxide, or 2- or 3-chloro, -bromo or -iodo alkanol; and where an acid addition salt is required, the resulting compound of Formula I is reacted with an inorganic or organic acid.

A compound of Formula II of the process (a) may be produced by hydrolising the reaction product of a compound of Formula III:

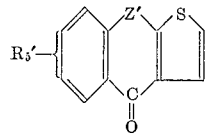

wherein $R_5'$ and $Z'$ have the above significance, with an organic magnesium halogen compound of Formula IV:

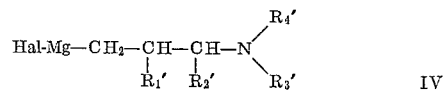

wherein $R_1'$, $R_2'$, $R_3'$, and $R_4'$ have the above significance, and Hal is chlorine, bromine, or iodine.

A compound of the Formula IIb of the process (b) may be produced by hydrolyzing the reaction product of a compound of Formula IIIa:

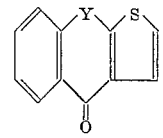

wherein Y has the above significance, with an organic magnesium halogen compound of Formula IVa:

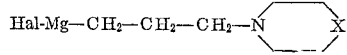

wherein Hal and X have the above significance. For instance, the magnesium halogen compound of Formula IVa may comprise (4,4 - ethylene-dioxy-piperidino)-propyl-magnesium halide.

One method of producing the compounds of Formula Ia of the process (a) consists in adding a solution of a 4H - benzo[4,5]cyclohepta[1,2-b]thiophen-4-one derivative of Formula III in a suitable absolute organic solvent, preferably tetrahydrofuran or diethyl ether, dropwise to an organic magnesium halogen compound of Formula IV dissolved in more of the same solvent. The mixture is advantageously stirred for 15 to 30 minutes or heated. Instead of magnesium, a magnesium-copper alloy in accordance with Gilman may also be utilized. The reaction product is subsequently hydrolysed in the cold with aqueous ammonium chloride solution and extracted with a water immiscible organic solvent, preferably methylene chloride, diethyl ether or benzene. The resulting 4H-benzo [4,5]cyclohepta[1,2-b]thiophen-4-ol derivative of Formula II is purified by crystallization and, if desired, converted into suitable salts with inorganic or organic acids or worked up further as such. The compounds of Formula Ia may then be obtained from the compound of Formula II by the action of a suitable agent for removing water. Examples of water removing agents which may be used are mineral acids, strong organic acids, acetic anhydride, thionyl chloride or phosphorus oxychloride. The conversion of the resulting compound of Formula Ia into its acid addition salts may be effected in manner known per se, i.e., by reaction with an organic or inorganic acid. Examples of preferred acids which may be used for salt formation are: hydrochloric, hydrobromic, phosphoric, sulphuric, acetic, malonic, fumaric, maleic, tartaric, malic, hexahydrobenzoic and p-toluene-sulphonic acid.

As indicated under the process (b), the ketalized carbonyl radical of the compound of Formula IIb is deketalized to produce a carbonyl radical at the same time as the elements of water are removed from the compound. The resulting 3-(4-oxo-piperidino)propylidene compound is then reduced to the corresponding 3-(4-hydroxy-piperidino)propylidene derivative by means of a complex metal hydride, such as sodium borohydride, in ethanol at boiling temperature.

One specific method of producing the piperazine compounds of Formula I of the processes (c) is as follows:

A 4 - [3 - (4 - methyl - piperazino) - propylidene] - 4H-benzo[4,5]cyclohepta[1,2-b]thiophene, or its 9,10-dihydro derivative, is reacted in an inert anhydrous organic solvent, e.g. absolute benzene or absolute toluene, with a chloroformic acid alkyl ($C_1$–$C_4$) ester, the alkoxy-carbonyl radical is split off from the resulting 4-[3-(4-alkoxy-carbonyl-piperazino)-propylidene derivative (after optional purification by crystallization) by heating with an alkali in alcoholic solution, preferably with potassium hydroxide in n-butanol, or by heating with a mineral acid. The resulting piperazino compound is isolated and purified in manner known per se.

The hydroxyalkylation of the process (d) may be carried out in the presence of an acid binding agent, such as an alkali metal carbonate.

The compounds of Formula I and their physiologically acceptable acid addition salts exhibit interesting pharmacological properties. They indicate sedative and neuroleptic properties. In tests with animals these properties are particularly distinguished by a narcosis potentiation, an adrenolytic effect, a reduction of spontaneous motor activity, a reduction of increased motor activity caused by the administration of amphetamine, and an inhibition of conditional and emotional reactions. Furthermore, the compounds of Formula I, in which $R_5$ is hydrogen, have antidepressive properties and, particularly, they exhibit an antagonism towards the central and peripheral effects of reserpine. The compounds exhibit an inhibition of cataleptic effects caused by the administration of tetrabenzine or perphenazine, and a potentiation of noradrenaline effects. Other effects noticed with compounds of Formula I tested, are a showing of anticholinergic and histaminolytic properties. The pharmacological effects mentioned above are especially marked in the case of 4-(3'-dimethylaminopropylidene) - 9,10 - dihydro - 4H - benzo[4,5] cyclohepta[1,2-b]thiophene, and the 6-chloro-derivative thereof.

The compounds of Formula I and their physiologically acceptable salts are therefore, indicated for use in therapy, and especially in the treatment of psychic illnesses, such as psychosis, neurosis, and psychic depression. An additional or alternative use is that of intermediates for the production of pharmaceutical compounds.

A suitable dosage of a compound I or a non-toxic salt thereof has been found to be of the order of 0.1–5.0 mg./kg. body weight of warm-blooded animal administered 1–3 times per day per os, i.e. a daily dosage of about 0.3–15 mg./kg. body weight of warm-blooded animal, e.g. primates.

The compounds of the invention are indicated for use as pharmaceuticals on their own or in the form of appropriate medicinal preparations for administration, e.g. enterally or parenterally. In order to produce suitable medicinal preparations the compounds are worked up with inorganic or oragnic adjuvants which are physiologically inert. Examples of such adjuvants are as follows:

| | |
|---|---|
| Tablets and dragées | Lactose, starch, talc and stearic acid. |
| Injectable solutions | Water, alcohols, glycerin, and vegetable oils. |
| Suppositories | Natural or hardened oils and waxes. |

The preparations may furthermore contain suitable preserving, stabilizing and wetting agents, solubilizers, sweetening and colouring substances or flavourings.

The present invention thus further provides pharmaceutical compositions containing, in addition to a pharmacologically acceptable carrier, a compound of Formula I and/or an acid addition salt thereof.

In the following non-limitative examples all temperatures are indicated in degrees centigrade and are uncorrected.

EXAMPLE 1

4-{2'-[1''-methyl-pyrrolidyl-(2'')]-ethylidene}-9,10-dihydro-4H-benzo[4,5]cyclohepta[1,2-b]thiopene (a) 4-{2'-[1''-methyl-pyrrolidyl-(2'')]-ethyl} - 9,10-dihydro-4H-benzo[4,5]cyclohepta[1,2-b]thiophen - 4 - ol.—1.64 g. of magnesium which have been activated with iodine are covered with a layer of 10 cc. of tetrahydrofuran and a few drops of ethylene bromide are added thereto. After reaction has commenced, a solution of 9.6 g. of 1-methyl-2-(β-chloro-ethyl)-pyrrolidine in 10 cc. of tetrahydrofuran is added dropwise so that the solvent boils and subsequently heating to the boil is effected for a further 45 minutes. A solution of 7.8 g. of 9,10-dihydro-4H-benzo[4,5]cyclohepta[1,2-b]thiophen-4-one in 15 cc. of tetrahydrofuran is added dropwise at 20° over 15 minutes and heating to the boil is effected for a further 15 minutes whilst stirring. After cooling, the reaction mixture is poured into 200 cc. of a 20% ammonium chloride solution, 200 cc. of methylene chloride are added and all is filtered through highly purified diatomaceous earth. After separating the organic phase, the aqueous portion is shaken out twice more with methylene chloride, the combined methylene chloride solutions are washed with water, dried over magnesium sulphate and evaporated at 15 mm. Hg. The residue is triturated with a small amount of ether, the precipitated substance is filtered off and recrystallized from hexane. 4-{2'-[1''-methyl-pyrrolidyl - (2'')]-ethyl}-9,10-dihydro-4H-benzo[4,5]cyclohepta[1,2-b]thiophen-4-ol melts at 105–106°.

(b) 4-{2'-[1''-methyl-pyrrolidyl-(2'')-ethylidene}-9,10-dihydro - 4H - benzo[4,5]cyclohepta[1,2-b]thiophene.—3.27 g. of 4{2'-[1''-methyl-pyrrolidyl-(2'')]-ethyl}9,10-dihydro-4H-benzo[4,5]cyclohepta[1,2-b]thiophen - 4 - ol are dissolved in 10 cc. of a 2 N isopropanolic hydrochloric acid solution, diluted with 15 cc. of isopropanol and heated to 50° for 5 minutes. Cooling is slowly effected to room temperature whilst stirring, the solution is filtered through animal charcoal and the solvent is evaporated at 15 mm. Hg. The residue is dissolved in water, the solution is made alkaline with sodium hydroxide solution whilst cooling and extracted three times with ether. The ether extract is washed with water, dried over magnesium sulphate and evaporated. The residue is dissolved in 10 cc. of isopropanol and a solution of 1.0 g. of fumaric acid in 4 cc. of isopropanol is added thereto. After cooling, the precipitated fumarate is filtered off and recrystallized from methanol/isopropanol. 4-{2'-[1''-methyl-pyrrolidyl - (2'')] - ethylidene} - 9,10 - dihydro-4H-benzo[4,5]cyclohepta[1,2-b]thiophene-hydrogen-fumarate, having a melting point of 203–205° decomposition) is obtained.

The 9,10-dihydro-4H-benzo[4,5]cyclohepta[1,2-b]thiophen-4-one used as starting material may be obtained as follows:

2-thenyl-diethyl phosphonate 133 g. of 2-thenyl chloride (boiling point 73–75°/15 mm. Hg) are heated to 150°, whereupon freshly distilled triethyl phosphite is slowly added dropwise whilst stirring at the same temperature and heating is effected for a further 2 hours to 160–170° whilst stirring. The reaction mixture is then distilled in a high vacuum; 2-thenyl-diethyl phosphonate boils at 120–124°/0.06 mm. Hg.

o-[2-thienyl-(2')-vinyl]-benzoic acid 30 g. of pulverized, well dried sodium methylate are added to a solution of 117 g. of 2-thenyl-diethyl phosphonate (boiling point 120–124°/0.06 mm. Hg) in 200 cc. of freshly distilled dimethyl formamide, whereby the temperature of the solution rises to 45–50°. The flask is then placed in an ice bath and a solution of 80 g. of o-phthalaldehydic acid in 200 cc. of dimethyl formamide is added dropwise so that the temperature remains between 35–40° and stirring is then continued for 30–60 minutes at room temperature. 1600 cc. of water (temperature 10–15°) are then added to the reaction solution, whilst cooling thoroughly, whereby a red oil separates. The material is then made alkaline with potassium carbonate, whereupon the oil redissolves; the red-brown solution is shaken out three times with benzene and the aqueous solution carefully adjusted to a pH value of 4 at 10–15° with hydrochloric acid. After several hours in a refrigerator, the precipitated acid is filtered off, dried and recrystallized from benzene. Melting point of o-[2-thienyl-(2')-vinyl]-benzoic acid 133–135°. The mother liquor is shaken out three times with methylene chloride, the organic phase is dried over sodium sulphate and evaporated at 15 mm. Hg. The residue is crystallized from benzene, whereupon a further portion of acid, having a melting point of 133–135°, is obtained.

o-[2-thienyl-(2')-ethyl]-benzoic acid 7.5 g. of sodium are melted under anhydrous toluene, thereafter 375 g. of pure mercury are added dropwise whilst shaking at frequent intervals so that the toluene boils. The mixture is then heated to 120–140° whilst stirring and, as soon as all the toluene has distilled off, cooled down to a temperature of 50°. The homogeneous amalgam is then covered with a solution of 20 g. of o-[2-thienyl-(2')-vinyl]-benzoic acid in 150 cc. of 95% ethanol and the mixture shaken for 30 minutes. Mercury is then separated, washed twice with ethanol and the combined ethanolic solutions are diluted with 1200 cc. of water. The solution is filtered through highly purified diatomaceous earth, acidified with hydrochloric acid and cooled to 5°. After several hours, the precipitated acid is filtered off and crystallized from chloroform/hexane. Melting point 110–111°.

9,10-dihydro-4H-benzo[4,5]cyclohepta[1,2-b]thiophen-4-one 59 cc. of 84% phosphoric acid and 86 g. of phosphorus pentoxide are first stirred for 30 minutes at 125–130°. 20 g. of powdered o-[2-thienyl(2')-ethyl]-benzoic acid are then introduced over a period of 30 minutes at this temperature. The reaction mixture is stirred for a further 2 hours at 125–130°, it is then poured into 1000 cc. of water, the solution is filtered through highly purified diatomaceous earth and extracted three times with methylene chloride. The organic phase is washed with 2 N sodium carbonate solution, dried over magnesium sulphate, the solvent is removed by evaporation and the residue is distilled in a high vacuum, whereby 9,10-dihydro-4H-benzo[4,5]cyclohepta[1,2-b]thiophen - 4 - one distills over as a green oil at 125–140°/0.05 mm. Hg.

EXAMPLE 2

4-(3'-dimethylamino-propylidene)-9,10-dihydro-4H-benzo[4,5]cyclohepta[1,2-b]thiophene (a) 4-(3'dimethylaminopropyl)-9,10 - dihydro - 4H - benzo[4,5]cyclohepta[1,2-b]thiophen - 4 - ol.—2.2 g. of magnesium which have been activated with iodine are covered with a layer consisting of a little tetrahydrofuran and a few drops of ethylene bromide are added thereto. After reaction has commenced, a solution of 10.8 g. of 3-dimethylaminopropyl chloride in 20 cc. of tetrahydrofuran is added dropwise so that the solvent boils and heating is then effected to the boil for a further 2 hours. A solution of 8.2 g. of 9,10-dihydro-4H-benzo[4,5]cyclohepta[1,2-b]thiophen-4-one in 30 cc. of tetrahydrofuran is added dropwise over 10 minutes and heating to the boil is effected for a further 10 minutes whilst stirring.

After cooling, the reaction mixture is poured into a solution of 30 g. of ammonium chloride in 200 cc. of water, 200 cc. of methylene chloride are added and all is filtered through highly purified diatomaceous earth. After separating the organic phase, the aqueous portion is shaken out twice more with methylene chloride. The combined methylene chloride extracts are washed with water, dried over magnesium sulphate and evaporated at 15 mm. Hg. The oily residue is crystallized from ether/petroleum ether. 4-(3'-dimethylaminopropyl)-9,10-dihydro - 4H - benzo[4,5]cyclohepta[1,2-b]thiophen-4-ol melts at 101°.

(b) 4-(3'-dimethylamino-propylidene) - 9,10 - dihydro-4H-benzo[4,5]cyclohepta[1,2-b]thiophene.—8 g. of 4-(3'-dimethylaminopropyl)-9,10-dihydro - 4H - benzo[4,5]cyclohepta[1,2-b]thiophen-4-ol, 80 cc. of glacial acetic acid and 32 cc. of concentrated hydrochloric acid are heated at reflux for 30 minutes, the reaction mixture is evaporated at 15 mm. Hg and the residue triturated with ethanol/ether (1:1). The precipitated hydrochloride is filtered off and recrystallized from ethanol/ether. 4-(3'-dimethylamino-propylidene)-9,10 - dihydro - 4H - benzo[4,5]cyclohepta[1,2 - b]thiophene hydrochloride melts at 222–224° (decomposition).

EXAMPLE 3

4-{2'-[1"-methyl-piperidyl - (2")]-ethylidene}-9,10-dihydro-4H-benzo[4,5]cyclohepta[1,2-b]thiophene 1.2 g. of magnesium which have been activated with iodine are covered with a layer of tetrahydrofuran and a few drops of ethylene bromide are added thereto. After reaction has commenced, a solution of 7.9 g. of 2-[1'-methyl-piperidyl-(2')]-ethyl chloride in 10 cc. of tetrahydrofuran is added dropwise so that the solvent boils and heating to the boil is effected for a further hour. A solution of 5.2 g. of 9,10-dihydro-4H-benzo[4,5]cyclohepta[1,2-b]thiophen-4-one in 10 cc. of tetrahydrofuran is added dropwise over 15 minutes and heating to the boil is effected for a further 15 minutes whilst stirring.

After cooling, the reaction mixture is poured into a solution of 30 g. of ammonium chloride in 150 cc. of water, diluted with 150 cc. of methylene chloride and all is filtered through highly purified diatomaceous earth. After separating the organic phase, the aqueous phase is extracted twice with methylene chloride, the combined methylene chloride extracts are washed with water, dried over potassium carbonate, and the solvent is evaporated at 15 mm. Hg. The oily residue is dissolved in 18% hydrochloric acid, the solution is washed twice with ether, made alkaline with sodium carbonate whilst cooling and extracted three times with methylene chloride. The combined methylene chloride extracts are dried over potassium carbonate, the solvent is evaporated at 15 mm. Hg and the residue recrystallized from ethanol. 4-{2'-[1"-methyl-piperidyl - (2")]-ethylidene}9,10-dihydro - 4H - benzo[4,5]cyclohepta[1,2-b]thiophene melts at 115–115.5°.

EXAMPLE 4

4-(3'-diethylamino-propylidene)-9,10-dihydro-4H-benzo[4,5]cyclohepta[1,2-b]thiophene (a) 4-(3'-diethylaminopropyl)-9,10-dihydro-4H-benzo[4,5]cyclohepta[1,2-b]thiophen-4-ol.—1.64 g. of magnesium which have been activated with iodine are covered with a layer of 10 cc. of tetrahydrofuran and a few drops of ethylene bromide are added thereto. After reaction has commenced, a solution of 9.8 g. of 3-diethylaminopropyl chloride in 10 cc. of tetrahydrofuran is added dropwise so that the solvent boils and heating to the boil is then effected for a further 1½ hours. A solution of 7.8 g. of 9,10-dihydro-4H-benzo[4,5]cyclohepta[1,2-b]thiophen-4-one in 15 cc. of tetrahydrofuran is added dropwise at 20° over 15 minutes and heating to the boil is effected for a further 30 minutes whilst stirring.

After cooling, the reaction mixture is poured into 200 cc. of a saturated ammonium chloride solution, 200 cc.

of methylene chloride are added and all is filtered through highly purified diatomaceous earth. After separating the organic phase, the aqueous portion is extracted twice more with methylene chloride, the combined methylene chloride extracts are washed wtih water, dried over magnesium sulphate and evaporated at 15 mm. Hg. The residue is recrystallized from isopropanol and yields 4-(3' - diethylaminopropyl) - 9,10 - dihydro - 4H - benzo[4,5]cyclohepta[1,2-b]thiophen-4-ol, having a melting point of 104.5–105.5°.

(b) 4-(3'-diethylamino-propylidene)-9,10-dihydro-4H-benzo[4,5]cyclohepta[1,2-b]thiophene.—6 g. of 4-(3'-diethylaminopropyl) - 9,10 - dihydro - 4H - benzo[4,5]-cyclohepta[1,2-b]thiophen-4-ol, 80 cc. of glacial acetic acid and 32 cc. of concentrated hydrochloric acid are heated at reflux for one hour, the reaction mixture is evaporated at 15 mm. Hg. and the residue is dissolved in water. The aqueous solution is made strongly alkaline with sodium hydroxide solution, is then extracted three times with ether, the extract is dried over magnesium sulphate and the solvent is evaporated. The oily residue is dissolved in acetone, an ethereal hydrogen chloride solution is added thereto and the precipitated hydrochloride is recrystallized from isopropanol. Melting point 175.5–177°.

EXAMPLE 5

4-(3'-dimethylamino-2'-methyl-propylidene)-9,10-dihydro-4H-benzo[4,5]cyclohepta[1,2-b]thiophene (a) 4 - (3' - dimethylamino - 2' - methylpropyl) - 9,10 - dihydro - 4H - benzo[4,5]cyclohepta[1,2-b]thiophen - 4 - ol.—This compound is produced from 1.64 g. of magnesium, 8.8 g. of 3-dimethylamino-2-methyl-propyl chloride and 7.8 g. of 9,10-dihydro-4H-benzo[4,5]cyclohepta-[1,2-b]thiophen-4-one in 35 cc. of tetrahydrofuran in a manner analogous to that described in Example 4(a). Melting point 115–116° after recrystallization from hexane.

(b) 4 - (3' - dimethylamino - 2' - methyl - propylidene) - 9,10 - dihydro - 4H - benzo[4,5]cyclohepta[1,2 - b]thiophene.—This compound is produced from 7.5 of 4 - (3' - dimethylamino - 2' - methylpropyl) - 9,10 - dihydro - 4H - benzo[4,5]cyclohepta[1,2 - b]thiophen - 4 - ol in 80 cc. of glacial acetic acid and 32 cc. of concentrated hydrochloric acid by heating to the boil for one hour in a manner analogous to that described in Example 4(b). Melting point of the hydrochloride 229–231° (decomposition) after recrystallization from isopropanol.

EXAMPLE 6

4 - [3' - (1" - pyrrolidyl) - propylidene] - 9,10 - dihydro - 4H - benzo[4,5]cyclohepta[1,2 - b]thiophene (a) 4 - [3' - (1" - pyrrolidyl) - propyl] - 9,10 - dihydro - 4H - benzo[4,5]cyclohepta[1,2 - b]thiophen - 4 - ol.—This compound is produced from 2.13 g. of magnesium, 12.5 g. of 3-(1'-pyrrolidyl)-propyl chloride and 10.3 g. of 9,10-dihydro-4H-benzo[4,5]cyclohepta[1,2-b]-thiophen-4-one in 50 cc. of tetrahydrofuran in a manner analogous to that described in Example 4(a). Melting point 132–133° after recrystallization from 95% ethanol.

(b) 4 - [3' - (1" - pyrrolidyl) - propylidene] - 9,10 - dihydro - 4H - benzo[4,5]cyclohepta[1,2 - b]thiophene.—This compound is produced from 8 g. of 4-[3'-(1"-pyrrolidyl) - propyl] - 9,10 - dihydro - 4H - benzo[4,5]cyclohepta[1,2-b]thiophen-4-ol in 80 cc. of glacial acetic acid and 32 cc. of concentrated hydrochloric acid by heating to the boil for one hour in a manner analogous to that described in Example 4(b). Melting point of the hydrochloride 215–217° (decomposition) after recrystallization from isopropanol/ether.

EXAMPLE 7

4 - [3' - (1" - piperidyl) - propylidene] - 9,10 - dihydro - 4H - benzo[4,5]cyclohepta[1,2 - b]thiophene (a) 4 - [3' - (1" - piperidyl) - propyl] - 9,10 - dihydro - 4H - benzo[4,5]cyclohepta[1,2 - b]thiophen - 4 - ol.— This compound is produced from 1.64 g. of magnesium, 10.5 g. of 3-(1'-piperidyl)-propyl chloride and 7.8 g. of 9,10 - dihydro - 4H - benzo[4,5]cyclohepta[1,2 - b]thiophen - 4 - one in 40 cc. of tetrahydrofuran in a manner analogous to that described in Example 4(a). Melting point 129–130° after recrystallization from 80% ethanol.

(b) 4 - [3' - (1"-piperidyl)-propylidene]-9,10-dihydro-4H - benzo[4,5]cyclohepta[1,2-b]thiophene.—This compound is produced from 8 g. of 4-[3'-(1"-piperidyl)-propyl]-9,10-dihydro - 4H - benzo[4,5]cyclohepta [1,2-b] thiophen-4-ol in 80 cc. of glacial acetic acid and 32 cc. of concentrated hydrochloric acid by heating to the boil for one hour, in a manner analogous to that described in Example 4(b). The base is distilled in a high vacuum; boiling point 205–210°/0.3 mm. Hg. The distillate is dissolved in acetone, the solution is saturated with hydrogen chloride gas and after 8 to 10 hours the hydrochloride which cyrstallizes out is filtered off; melting point 169–170° after recrystallization from ethanol/isopropanol.

EXAMPLE 8

4-[(1'-methyl-3'-pyrrolidyl)-methylene]-9,10-dihydro-4H-benzo[4,5]cyclohepta[1,2-b]thiophene (a) 4 - [(1'-methyl-3'-pyrrolidyl)-methyl]-9,10-dihydro - 4H - benzo[4,5]cycloheptal[1,2-b]thiophen-4-ol.—This compound is produced from 2.46 g. of magnesium, 13.11 g. of (1-methyl-3-pyrrolidyl)-methyl chloride and 11.7 g. of 9,10-dihydro-4H-benzo[4,5]cyclohepta[1,2-b] thiophen-4-one in 60 cc. of tetrahydrofuran in a manner analogous to that described in Example 4(a). Melting point 173–174° after recrystallization from 80% ethanol.

(b) 4 - [(1' - methyl-3'-pyrrolidyl)-methylene]-9,10-dihydro - 4H - benzo[4,5]cyclohepta[1,2-b]thiophene.— This compound is produced from 9 g. of 4-[(1'-methyl-3'-pyrrolidyl) - methyl] - 9,10-dihydro-4H-benzo[4,5]cyclohepta[1,2-b]thiophen-4-ol in 80 cc. of glacial acetic acid and 32 cc. of concentrated hydrochloric acid by heating to the boil for one hour, in a manner analogous to that described in Example 4(b). Melting point of the hydrochloride 189–190° after recrystallization from isopropanol/ether, 172–173° from dioxane.

EXAMPLE 9

4-[(1'-methyl-3'-piperidyl)-methylene]-9,10-dihydro-4H-benzo[4,5]cyclohepta[1,2-b]thiophene (a) 4 - [(1'-methyl-3'-piperidyl)-methyl]-9,10-dihydro-4H - benzo[4,5]cycloheptal[1,2-b]thiophen - 4-ol.—This compound is produced from 1.64 g. of magnesium, 9.6 g. of (1-methyl-3-piperidyl)-methyl chloride and 7.8 g. of 9,10 - dihydro-4H-benzo[4,5]cycloheptal[1,2-b]thiophen-4-one in 45 cc. of tetrahydrofuran in a manner analogous to that described in Example 4(a). Melting point 210–211° after recrystallization from benzene/ethanol.

(b) 4 - [(1'-methyl-3'-piperidyl)-methylene]-9,10-dihydro - 4H - benzo[4,5]cyclohepta[1,2-b]thiophene.—This compound is produced from 7 g. of 4-[(1'-methyl-3'-piperidyl) - methyl)] - 9,10-dihydro-4H-benzo[4,5]cyclohepta[1,2-b]thiophen-4-ol in 75 cc. of glacial acetic acid and 30 cc. of concentrated hydrochloric acid by heating to the boil for one hour in a manner analogous to that described in Example 4(b). Melting point of the hydrochloride 175–180° (decomposition) after recrystallization from n-butanol/ether.

EXAMPLE 10

(a) 4 - (3-dimethylamino-propyl)-4H-benzo[4,5]cycloheptal[1,2-b]thiophen-4-ol.—2.2 g. of magnesium which have been activated with iodine are covered with a layer of 15 cc. of absolute tetrahydrofuran and a few drops of ethylene bromide are added thereto. After the reaction has commenced a solution of 10.8 g. of 3-dimethylaminopropyl chloride in 20 cc. of absolute tetrahydrofuran is added dropwise at such a rate that the solvent boils and the mixture is subsequently heated to the boil for a further hour. A solution of 8.2 g. of 4H-benzo[4,5]cyclohepta-[1,2-b]thiophen-4-one in 30 cc. of absolute tetrahydrofuran is then added dropwise at 20° whilst cooling during the course of 15 minutes and heating to the boil is effected for a further 30 minutes. After cooling, the reaction mixture is poured into 250 cc. of saturated aqueous ammonium chloride solution, 200 cc. of methylene chloride are added and the resulting material is filtered through highly purified diatomaceous earth. After separating the organic phase, the aqueous portion is shaken out twice with methylene chloride, the combined methylene chloride solutions are washed with water, dried over magnesium sulphate and evaporated at 15 mm. Hg. The crystalline residue is recrystallized from ethanol or ethanol/hexane. Melting point 121–122°.

(b) 4 - (3-dimethylamino-propylidene)-4H-benzo[4,5] cyclohepta[1,2-b]thiophene.—A solution of 4 g. of 4-(3-dimethylamino-propyl) - 4H-benzo[4,5]cyclohepta[1,2-b] thiophen-4-ol in 250 cc. of acetic anhydride is heated to the boil for 6 hours. After distilling off approximately 200 cc. of solvent, the residue is poured into 1200 cc. of water whilst stirring, the aqueous solution is filtered through highly purified diatomaceous earth, made strongly alkaline with 20% sodium hydroxide solution and the alkaline solution is extracted three times with ether. The combined ether extracts are washed with water, dried over magnesium sulphate and evaporated. The resulting residue is distilled in a high vacuum, whereby 4-(3-dimethyl-amino-propylidene) - 4H - benzo[4,5]cycloheptal[1,2-b] thiophen distills over at 160–165°/0.1 mm. Hg.

Malonate

A hot solution of 1.4 g. of malonic acid in 10 cc. of isopropanol is added to a solution of 3.8 g. of the base in 10 cc. of isopropanol and after cooling the precipitated salt is filtered off. After recrystallization from ethanol/isopropanol the malonate melts at 142–143° (decomposition).

The 4H - benzo[4,5]cyclohepta[1,2-b]thiophen-4-one used as starting material is produced as follows:

2-thenyl-diethyl-phosphonate 133 g. of thenyl-chloride (boiling point 73–75°/15 mm. Hg) are heated to 150°, whereupon 175 g. of freshly distilled triethyl phosphite are slowly added dropwise whilst stirring at the same temperature and heating is effected for a further 2 hours to 160–170°. The reaction mixture is then distilled in a high vacuum; 2-thenyl-diethyl-phosphonate boils at 120–124°/0.06 mm. Hg.

2-[2-thienyl-(2)-vinyl]-benzoic acid 30 g. of powdered, well dried sodium methylate are added to a solution of 117 g. of 2-thenyl-diethyl-phosphonate in 200 cc. of freshly distilled dimethyl formamide, whereby the temperature of the solution rises to 45–50°. The flask is then placed on an ice bath and a solution of 80 g. of o-phthalaldehydic acid in 200 cc. of dimethyl formamide is added dropwise at such a rate that the temperature remains between 35–40° and stirring is effected for a further 30–60 minutes at room temperature. 1600 cc. of water (temperature 10–15°) are then added to the reaction solution whilst cooling well, whereby a red oil precipitates. The oil is then made alkaline with potassium carbonate whereby it redissolves, the red-brown solution is shaken out three times with benzene and hydrochloric acid is carefully added at 10–15° to adjust the pH value of the aqueous solution to 4. After standing for a number of hours in a refrigerator, the precipitated acid is filtered off, dried and recrystallized from benzene. The melting point of 2-[2-thienyl-(2)-vinyl]-benzoic acid is 133–135°.

The mother liquor is shaken out three times with methylene chloride, the organic phase is dried over sodium sulphate and evaporated at 15 mm. Hg. The residue is crystallized from benzene, whereby a further portion of acid, having a melting point of 133–135°, is obtained.

2-[2-thienyl-(2)-ethyl]-benzoic acid 7.5 g. of sodium are melted under anhydrous toluene, whereupon 375 g. of pure mercury are added dropwise whilst stirring frequently at such a rate that the toluene boils. The mixture is then heated to 120–140° whilst stirring and as soon as all the toluene is distilled off cooling is effected to 50°. A solution of 20 g. of 2-[2-thienyl-(2)-vinyl]-benzoic acid in 150 cc. of 95% ethanol is poured into the homogeneous amalgam and the mixture is shaken for 30 minutes. The mercury is then separated, washing is effected twice with ethanol and the combined ethanolic solutions are diluted with 1200 cc. of water. The solution is filtered through highly purified diatomaceous earth, acidified with hydrochloric acid and cooled to 5°. After several hours the precipitated acid is filtered off and crystallized from chloroform/hexane. Melting point 110–111°.

9,10 - dihydro-4H-benzo[4,5]cyclohepta[1,2-b]thiophen-4-one 59 cc. of 84% phosphoric acid and 86 g. of phosphorus pentoxide are first stirred at 125–130° for 30 minutes. 20 g. of powered 2-[2-thienyl-(2)-ethyl]-benzoic acid are then added at this temperature during the course of 30 minutes. The reaction mixture is stirred for a further 2 hours at 125–130°, poured into 1000 cc. of water, the solution is filtered through highly purified diatomaceous earth and extracted three times with methylene chloride. The organic phase is washed with 2 N sodium carbonate solution, dried over magnesium sulphate, the solvent is evaporated and the residue distilled in a high vacuum, whereby 9,10 - dihydro-4H-benzo[4,5]cyclohepta[1,2-b]-thiophen-4-one distills over at 125–140°/0.55 mm. Hg in the form of a green oil. $n_D^{24}=1.6559$.

4H-benzo[4,5]cyclohepta[1,2-b]thiophen-4-one

In order to introduce the double bond in the 9,10-position, a mixture of 32.1 g. of the dihydro compound obtained in the preceding paragraph.

26.7 g. of N-bromosuccinimide and 0.3 g. of benzoyl peroxide in 250 cc. of absolute carbon tetrachloride is heated to the boil for 4 hours. After cooling to 50° the reaction mixture is filtered through highly purified diatomaceous earth and the solvent is evaporated at 15 mm. Hg. The resulting oily residue is then heated with 200 cc. of triethylamine whilst stirring for 2 hours. After evaporating the unreacted triethylamine 250 cc. of methylene chloride are added to the residue and the resulting solution is washed three times with 2 N hydrochloric acid and twice with water. After drying the solution over magnesium sulphate the solvent is removed at reduced pressure. The residue is then distilled in a high vacuum, whereby 4H - benzo[4,5]cyclohepta[1,2–b] thiophen-4-one distills over at 173–180°/0.1 mm. Hg in the form of an oil and crystallizes upon cooling. Melting point 109–110° after recrystallization from ethanol.

EXAMPLE 11

4-{2 - [1 - methyl-piperidyl-(2)]-ethylidene}-4H-benzo [4,5]cyclohepta[1,2,-b]thiophene 2.2 g. of magnesium which have been activated with iodine are covered with a layer of 15 cc. of tetrahydrofuran and a few drops of ethylene bromide are added. After the reaction has commenced a solution of 12.6 g. of 2-[1-methyl-piperidyl-(2)]-ethyl chloride in 15 cc. of tetrahydrofuran is added dropwise at such a rate that the solvent boils and heating to the boil is subsequently effected for a further 1½ hours. A solution of 8.2 g. of 4H-benzo[4,5]cyclohepta[1,2–b] thiophen-4-one in 20 cc. of tetrahydrofuran is added dropwise at 20° during the course of 15 minutes and heating is effected to 40° whilst stirring for a further 45 minutes. After cooling the reaction mixture is poured into 250 cc. of a 20% ammonium chloride solution, diluted with 200 cc. of methylene chloride and filtered through highly purified diatomaceous earth. After separating the organic phase, the aqueous portion is shaken out three times with methylene chloride, the combined methylene chloride extracts are washed with water, dried over sodium sulphate and evaporated at 15 mm. Hg.

The oily 4-{2-[1-methyl-piperidyl-(2)]-ethyl}-4H-benzo[4,5]cyclohepta[1,2-b]thiophen-4-ol is then dissolved in 200 cc. of hydrochloric acid (1:1), the acid solution is washed twice with ether and then made strongly alkaline with sodium hydroxide solution whilst cooling. This aqueous solution is shaken out three times with methylene chloride, the methylene chloride extracts are washed with water, dried over magnesium sulphate and evaporated at 15 mm. Hg. The oily residue is dissolved in isopropanol and an isopropanolic salicylic acid solution is added thereto. After cooling the precipitated 4-{2-[1-methyl-piperidyl - (2)] - ethylidene} - 4H - benzo[4,5]cyclohepta[1,2-b]thiophene salicylate is filtered off and recrystallized from isopropanol. Melting point 167–168°.

EXAMPLE 12

4-[3-(4-hydroxy-piperidine)-propylidene]-9,10-dihydro-4H-benzo[4,5]cyclohepta[1,2-b]thiophene (a) 4-hydroxy - 4 - [3-(4,4-ethylenedioxy-piperidino)-propyl]-9,10-dihydro - 4H - benzo[4,5]cyclohepta[1,2-b]thiophene.—0.2 cc. of ethylene bromide are added at a bath temperature of 60° to a suspension of 3.5 g. of iodine activated magnesium in 9 cc. of absolute tetrahydrofuran. After the reaction has commenced a solution of 33.4 g. of 1-(3-chloropropyl)-4-piperidone-ethylene ketal (boiling point 121–125°/0.6 mm. of Hg) in 60 cc. of absolute tetrahydrofuran is added dropwise at the same temperature. The reaction mixture is subsequently stirred for 2 hours at 95° and after cooling to room temperature a solution of 15.7 g. of 9,10-dihydro-4H-benzo[4,5]cyclohepta[1,2-b]thiophen-4-one in 120 cc. of absolute tetrahydrofuran is added dropwise to the mixture. After stirring for 30 minutes at 95° the reaction mixture is poured into 300 cc. of a 20% solution of ammonium chloride, extracted thrice with a total of 600 cc. of ether, the extracts are dried over sodium sulphate and the solvent is evaporated at reduced pressure. The viscous residue is boiled in 150 cc. of hexane, whereupon the material crystallizes. After recrystallization from acetone/hexane pure 4-hydroxy-4-[3 - (4,4-ethylenedioxy-piperidino)-propyl] - 9,10 - dihydro-4H-benzo[4,5]cyclohepta[1,2-b]thiophene, having a melting point of 133–134.5°, is obtained.

(b) 4-[3-(4-oxo-piperidino)-propylidene] - 9,10 - dihydro-4H-benzo[4,5]cyclohepta[1,2-b]thiophene.—A mixture of 12.3 g. of 4-hydroxy-4-[3-(4,4-ethylenedioxy-piperidino)-propyl] - 9,10 - dihydro-4H-benzo[4,5]cyclohepta[1,2-b]thiophene, 180 cc. of water and 40 cc. of 2 N hydrochloric acid is heated to the boil at reflux for 10 hours. A 40% potassium hydroxide solution is then added to the reaction mixture whilst cooling with ice until a strong alkaline reaction is obtained and the liberated base is extracted several times with methylene chloride. The combined extracts are washed with water until neutral, dried over sodium sulphate and the solvent is evaporated at 15 mm. of Hg. The residue, crude 4-[3-(4-oxo-piperidino)-propylidene] - 9,10 - dihydro-4H-benzo[4,5]cyclohepta[1,2-b]thiophene, is worked up further as such without additional purification.

(c) 4-[3 - (4 - hydroxy-piperidino)-propylidene]-9,10-dihydro-4H-benzo[4,5]cyclohepta[1,2 - b]thiophene.—4.2 g. of sodium borohydride are added portionwise to a solution of 8.0 g. of 4-[3-(4-oxo-piperidino)propylidene]-9,10 - dihydro-4H-benzo[4,5]cyclohepta[1,2-b]thiophene in 100 cc. of absolute ethanol at the boil. After boiling the reaction mixture at reflux for two hours the excess sodium borohydride is decomposed by the addition of a small amount of acetone and methanol. The reaction mixture is then evaporated to dryness at 15 mm. of Hg. The residue is taken up in water and the reaction mixture is extracted several times with methylene chloride. The combined extracts are washed with water until neutral, dried over sodium sulphate and evaporated to dryness at 15 mm. of Hg.

Hydrochloride

The calculated amount of ethanolic hydrochloric acid is added to a solution of the base obtained above in acetone and the solution is then evaporated. By recrystallizing the residue twice from isopropanol/acetone pure 4-[3-(4-hydroxy-piperidino)propylidene] - 9,10 - dihydro-4H-benzo[4,5]cyclohepta[1,2-b]thiophene hydrochloride, having a melting point of 225.5–226.5° (decomposition), is obtained.

EXAMPLE 13

4-[3-(4-methyl-piperazinyl)-propylidene]-9,10-dihydro-4H-benzo[4,5]cyclohepta[1,2-b]thiophene (a) 4-hydroxy - 4 - [3-(4-methyl-piperazinyl)-propyl]-9,10 - dihydro - 4H - benzo[4,5]cyclohepta[1,2 - b]thiophene.—2.2 g. of iodine activated magnesium are covered with a layer of absolute tetrahydrofuran and a few drops of ethylene bromide are added thereto. After the reaction has commenced a solution of 14 g. of 3-(4-methyl-piperazinyl)-propyl chloride in 10 cc. of absolute tetrahydrofuran is added dropwise at such a rate that the solvent boils. After heating at reflux for 6 hours a solution of 8.2 g. of 9,10-dihydro-4H-benzo[4,5]cyclohepta[1,2-b]thiophen-4-one in 20 cc. of absolute tetrahydrofuran is added dropwise during the course of 15–20 minutes and heating to the boil is effected for a further 15 minutes. After cooling the reaction mixture is poured into a solution of 50 g. of ammonium chloride in 250 cc. of water, 200 cc. of chloroform are added and the entire material is filtered through highly purified diatomaceous earth. After separating the organic phase the aqueous portion is extracted twice more with chloroform, the combined chloroform extracts are washed again with water, dried over magnesium sulphate and the solvent is evaporated at 15 mm. of Hg. The residue is recrystallized from hexane. The compound melts at 151–152°.

(b) 4 - [3 - (4-methyl-piperazinyl)-propylidene]-9,10-dihydro - 4H - benzo[4,5]cyclohepta[1,2-b]thiophene.—8 g. of 4-hydroxy-4-[3-(4-methyl-piperazinyl)-propyl]-9,10-dihydro - 4H - benzo[4,5]cyclohepta[1,2-b]thiophene, 160 cc. of glacial acetic acid and 60 cc. of concentrated hydrochloric acid are heated at reflux for one hour, the reaction mixture is evaporated at a pressure of 15 mm. of Hg and the residue is triturated with 95% ethanol. After several hours the precipitated dihydrochloride is filtered off and recrystallized from ethanol/ether. 4-[3 - (4-methyl-piperazinyl)-propylidene]-9,10-dihydro - 4H - benzo[4,5]cyclohepta[1,2-b]thiophene dihydrochloride has a melting point of 262–264° (decomposition).

EXAMPLE 14

4-[3-(1-piperazinyl)-propylidene]-9,10-dihydro-4H-benzo[4,5]cyclohepta[1,2-b]thiophene (a) 4-[3-(4-carbethoxy-piperazinyl)-propylidene]9,10-dihydro - 4H - benzo[4,5]cyclohepta[1,2-b]thiophene.—A solution of 20.4 g. of 4-[3-(4-methylpiperazinyl)-propylidene] - 9,10 - dihydro - 4H - benzo[4,5]cyclohepta[1,2-b]thiophene produced in accordance with Example 13) in 120 cc. of absolute benzene is added dropwise at room temperature whilst stirring to a solution of 19.65 g. of chloroformic acid ethyl ester in 120 cc. of absolute benzene. The reaction mixture is subsequently heated to 100° for 2 hours. After cooling to room temperature the reaction mixture is diluted with 200 cc. of benzene and is then extracted three times, each time with 150 cc. of water. The combined extracts are dried over sodium sulplate and evaporated to dryness at 50° and a pressure of 15 mm. of Hg. The residue, 4-[3(4-carbethoxy-piperazinyl)-propylidene] - 9,10 - dihydro - 4H - benzo[4,5]cyclohepta[1,2-b]thiophene, is worked up further as such without purification.

(b) 4-[3-(1-piperazinyl)-propylidene] - 9,10 - dihydro-4H-benzo[4,5]cyclohepta[1,2-b]thiophene.—A solution of 16.73 g. of potassium hydroxide and 23.49 g. of 4-[3-(4-carbethoxy-piperazinyl)-propylidene] - 9,10 - dihydro-4H-benzo[4,5]cyclohepta[1,2-b]thiophene in 200 cc. of n-butanol is heated to the boil at reflux for 7 hours. The reaction mixture is subsequently evaporated to dryness at 15 mm. of Hg and the residue is taken up in 300 cc. of water. The aqueous solution is then made acid to Congo red indicator by the addition of concentrated hydrochloric acid whilst cooling with ice and is shaken out three times with ether. The acid aqueous layer is then made alkaline with concentrated ammonium hydroxide solution and the liberated base is extracted four times, each time with 200 cc. of chloroform. The combined extracts are dried over sodium sulphate, filtered over active charcoal and the filtrate is evaporated to dryness at 50° and 15 mm. of Hg. The viscous residue is distilled in a hot air bath in a high vacuum, whereby 4-[3-(1-piperazinyl)-propylidene] - 9,10 - dihydro - 4H - benzo[4,5]cyclohepta[1,2-b]thiophene distils over at an air bath temperature of 200–220° and a pressure of 0.04 mm. of Hg.

Dihydrochloride

The calculated amount of ethanolic hydrochloric acid is added to a solution of the base in acetone, evaporation is effected to dryness and the residue is recrystallized twice from ethanol/acetone. Pure 4-[3-(1-piperazinyl)-propylidene] - 9,10 - dihydro - 4H - benzo[4,5]cyclohepta[1,2-b]thiophene dihydrochloride has a melting point of 275° (decomposition).

EXAMPLE 15

4-{3 - [4 - (2-hydroxyethyl)-piperazinyl]-propylidene}-9,10-dihydro - 4H - benzo[4,5]cyclohepta[1,2-b]thiophene A solution of 6.48 g. of 4-[3-(1-piperazinyl)-propylidene] - 9,10 - dihydro-4H-benzo[4,5]cyclohepta[1,2-b]thiophene (produced in accordance with Example 14) and 1.76 g. of ethylene oxide in 40 cc. of absolute ethanol is heated to 100° in a bomb-tube for one hour. The contents of the tube are then evaporated to dryness at 15 mm. of Hg and the residue is dissolved in acetone. The calculated amount of ethanolic hydrochloric acid is added to this solution, boiling is effected after the addition of a small amount of ethanol and cooling is then effected with ice. The crystalline precipitate is filtered off and recrystallized twice from approximately 90% ethanol. Pure 4-{3-[4 - (2-hydroxyethyl)-piperazinyl]-propylene}-9,10-dihydro - 4H - benzo[4,5]cyclohepta[1,2-b]thiophene dihydrochloride has a melting point of 261–262° (decomposition).

EXAMPLE 16

4-[3-(4-morpholinyl)-propylidene] - 9,10 - dihydro-4H-benzo[4,5]cyclohepta[1,2-b]thiophene (a) 4-hydroxy - 4 - [3-(4-morpholinyl)-propyl]-9,10-dihydro - 4H - benzo[4,5]cyclohepta[1,2-b]thiophene.—This compound is produced from 1.64 g. of magnesium, 10.6 g. of 3-(4-morpholinyl)-propyl chloride and 7.8 g. of 9,10-dihydro - 4H - benzo[4,5]cyclohepta[1,2-b]thiophen-4-one in 45 cc. of tetrahydrofuran in a manner analogous to that described in Example 13. Melting point 107–107.5° after recrystallization from 95% ethanol.

(b) 4-[3-(4-morpholinyl)-propylidene] - 9,10 - dihydro - 4H - benzo[4,5]cyclohepta[1,2-b]thiophene.—This compound is produced from 6 g. of 4-hydroxy-4-[3-(4-morpholinyl)-propyl] - 9,10 - dihydro-4H-benzo[4,5]cyclohepta[1,2-b]thiophene in 80 cc. of glacial acetic acid and 32 cc. of concentrated hydrochloric acid by heating to the boil for one hour (in a manner analogous to that described in Example 13). The hydrochloride has a melting point of 256–257° (decomposition) after recrystallization from absolute ethanol.

EXAMPLE 17

4-[3-(4-methyl-piperazinyl)-propylidene]-4H-benzo[4,5]cyclohepta[1,2-b]thiophene (a) 4-hydroxy - 4 - [3-(4-methyl-piperazinyl)-propyl]-4H-benzo[4,5]cyclohepta[1,2-b]thiophene.—This compound is produced from 15.8 g. of 1-methyl-4-(3-chloropropyl-(1)]-piperazine, 2.2 g. of magnesium and 8.2 g. of 4H-benzo[4,5]cyclohepta[1,2-b]thiophen-4-one in 50 cc. of tetrahydrofuran in a manner analogous to that described in Example 13(a). Melting point 140–141° from absolute ethanol.

(b) 4-[3 - (4 - methyl-piperazinyl)-propylidene]4H-benzo[4,5]cyclohepta[1,2-b]thiophene.—A solution of 5 g. of 4-hydroxy-4-[3-(4-methyl-piperazinyl)-propyl]-4H-benzo[4,5]cyclohepta [1,2-b]thiophene in 300 cc. of acetic anhydride is heated to the boil for 6 hours. After approximately 200–250 cc. of solvent have distilled off the residue is poured whilst stirring into 1500 cc. of water, the aqueous solution is filtered through highly purified diatomaceous earth, is made strongly alkaline with a 20% sodium hydroxide solution and the alkaline solution is extracted three times with ether. The combined ether extracts which have been washed with water and dried over magnesium sulphate are then evaporated. The crude 4-[3-(4-methyl-piperazinyl) - propylidene]-4H-benzo[4,5]cyclohepta[1,2-b]thiophene obtained as residue is converted as such into the dihydrochloride.

Dihydrochloride

Produced by introducing hydrogen chloride gas into an isopropanolic solution of the base. Melting point 236–240° (decomposition) after recrystallization from ethanol.

The 4H - benzo[4,5]cyclohepta[1,2-b]thiophen-4-one used as starting material is obtained as follows:

A mixture of 32.1 g. of 9,10-dihydro-4H-benzo[4,5] cyclohepta[1,2-b]thiophen-4-one, 26.7 g. of N-bromosuccinimide and 0.3 g. of benzoyl peroxide in 250 cc. of absolute carbon tetrachloride is heated to the boil for 4 hours. After cooling to 50° the reaction mixture is filtered through highly purified diatomaceous earth and the solvent is evaporated at 15 mm. of Hg. The resulting oily residue is then heated for 2 hours whilst stirring with 200 cc. of triethylamine. After evaporating unconverted triethylamine 250 cc. of methylene chloride are added to the residue and the resulting solution is washed three times with 2 N hydrochloric acid and twice with water. After drying the solution over magnesium sulphate the solvent is removed at reduced pressure. The residue is then distilled in a high vacuum, whereby 4H-benzo[4,5]cyclohepta[1,2-b]thiophen-4-one distils over as an oil at 173–180°/0.1 mm. of Hg and crystallizes upon cooling. Melting point 109–110° after recrystallization from ethanol.

EXAMPLE 18

(a) 6-chloro-4-(3-dimethylamino-propyl)-9,10-dihydro-4H-benzo[4,5]cyclohepta[1,2-b]thiophen-4-ol.—1.1 g. of magnesium which has been activated with iodine is covered with a layer of 10 cc. of absolute tetrahydrofuran and a few drops of ethylene bromide are added. After the reaction has commenced a solution of 5.4 g. of 3-dimethylamino-propyl chloride in 10 cc. of absolute tetrahydrofuran is added dropwise at such a rate that the solvent boils and the mixture is subsequently heated for a further hour. A solution of 4.8 g. of 6-chloro-9,10-dihydro-4H-benzo[4,5]cyclohepta[1,2-b]thiophen-4-one in 10 cc. of absolute tetrahydrofuran is then added dropwise at 20° during the course of 15 minutes and the mixture is heated to the boil for a further 15 minutes. The cooled reaction mixture is then poured into 50 cc. of a saturated aqueous ammonium chloride solution, 150 cc. of ether are added and the entire material is filtered through highly purified diatomaceous earth. After separating the organic phase the aqueous portion is shaken out twice more with ether, dried over magnesium sulphate and evaporated in a vacuum. The oily residue is crystallized from ethanol whilst treating with animal charcoal. Melting point 140.5–141.5°.

(b) 6-chloro-4-(3-dimethylamino-propylidene) - 9,10-dihydro-4H-benzo[4,5]cyclohepta[1,2-b]thiophene.—5 g. of 6-chloro-4-(3-dimethylamino-propyl)-9,10-dihydro-4H-benzo[4,5]cyclohepta[1,2-b]thiophen-4-ol are heated at reflux for one hour in a mixture of 75 cc. of glacial acetic acid and 30 cc. of concentrated hydrochloric acid, the reaction mixture is then evaporated to half its volume at 15 mm. Hg, diluted with 600 cc. of water and made strongly alkaline with sodium hydroxide solution. The aqueous alkaline solution is subsequently extracted three times with methylene chloride, the combined methylene chloride extracts are washed with water and dried over magnesium sulphate. After evaporating the solvent the oily residue is crystallized from ligroin (boiling point 70–80°). 6-chloro-4 - (3-dimethylamino-propylidene)-9,10-dihydro-4H-benzo[4,5]cyclohepta[1,2-b]thiophene melts at 106–107°.

Hydrochloride

The calculated quantity of isopropanolic hydrochloric acid is added to a solution of the pure base in isopropanol and the reaction mixture is evaporated to half its volume. After a number of hours the precipitated hydrochloride is filtered off and recrystallized from isopropanol. Melting point 261–263° (decomposition).

The 6 - chloro - 9,10 - dihydro - 4H - benzo[4,5]cyclohepta[1,2-b]thiophen-4-one used as starting material is produced as follows:

5-chloro-phthalaldehydic acid

A mixture of 60 g. of 6-chlorophthalide, 61.5 g. of N-bromosuccinimide and 0.15 g. of benzoyl peroxide in 4000 cc. of anhydrous carbon tetrachloride is heated to the boil whilst stirring for 22 hours. The solution is filtered off whilst hot and the filtrate is evaporated at 15 mm. Hg. The crude 3-bromo-6-chlorophthalide is then heated to 100° for 8 hours with 400 cc. of water and the solution is filtered through highly purified diatomaceous earth. After cooling the precipitated acid is filtered off, the diatomaceous earth is heated to the boil once more for a number of hours together with the mother liquor, the solution is filtered whilst hot and evaporated to a small extent at reduced pressure, whereby a further portion of acid is obtained. After drying in a vacuum at 90° the acid melts at 136–138°.

5-chloro-2-[2-(2-thienyl)-vinyl]-benzoic acid 1 to 2 cc. of a solution of 70 g. of 5-chloro-phthalaldehydic acid and 89 g. of 2-thenyl-diethyl-phosphonate in 135 cc. of dimethyl formamide are added dropwise to a suspension of 45.6 g. of sodium methylate in 135 cc. of dimethyl formamide, whereby the temperature of the mixture rises to 35–40°. The flask is then placed on an ice bath and the remainder of the solution of 5-chloro-phthalaldehydic acid and 2-thenyl-diethyl-phosphonate is added dropwise as rapidly as possible and at such a rate that the internal temperature remains at 35–40°. The reaction mixture is then stirred for a further 30 minutes at room temperature. 4300 cc. of water are slowly added to the reaction solution at 10–15° whilst cooling well and this aqueous solution is shaken out with 300 cc. of benzene. The aqueous solution is then carefully adjusted to a pH value of 3 to 4 with 2 N hydrochloric acid at 10–15°. After a number of hours the precipitated acid is filtered off and dried. Melting point 152–153° from benzene.

5-chloro-2-[2-(2-thienyl)-ethyl]-benzoic acid 18.8 g. of sodium are melted under anhydrous toluene, whereupon 1250 g. of pure mercury are added dropwise whilst shaking frequently at such a rate that the toluene boils. The mixture is then heated to 120–140° whilst stirring and cooled to 60° as soon as all the toluene is distilled off. A solution of 50 g. of 5-chloro-2-[2-(2-thienyl)-vinyl]-benzoic acid in 350 cc. of 95% ethanol is poured into the homogeneous amalgam and the mixture is shaken vigorously during 1½ to 2 hours. The mercury is then separated, washing is effected three times with ethanol and the combined ethanolic solutions are diluted with 5000 cc. of water. The solution is filtered through highly purified diatomaceous earth and slowly adjusted to a pH value of 1 with 2 N hydrochloric acid whilst stirring and cooling. After a number of hours the precipitated acid is filtered off and recrystallized from ethanol. Melting point 134–135°.

6-chloro-9-,10-dihydro-4H-benzo[4,5]cyclohepta[1,2-b]thiophen-4-one 90 cc. of 84% phosphoric acid and 126 g. of phosphorus pentoxide are first stirred at 125–130° for 30 minutes. 30 g. of finely powdered 5-chloro-2-[2-(2-thienyl)-ethyl]-benzoic acid are then added at the same temperature during the course of 30 minutes. The reaction mixture is stirred for one hour at 125–130°, poured into 1500 cc. of ice water, the solution is filtered through highly purified diatomaceous earth and extracted three times with methylene chloride. The organic phase is washed with 2 N sodium carbonate solution, then with water, dried over magnesium sulphate, the solvent is evaporated and the residue distilled in a high vacuum, whereby 6-chloro-9,10-dihydro-4H-benzo[4,5]cyclohepta[1,2-b]thiophen-4-one distils over as an oil at 185–195°/0.1 mm. Hg. which crystallizes. Melting point 107–108° from ether.

EXAMPLE 19

(a) 6 - chloro - 4 - [3 - (4 - methyl - piperazino) - propyl] - 9,10 - dihydro - 4H - benzo[4,5]cyclohepta[1,2-b]thiophen-4-ol.—This compound is obtained from 7.9 g. of 4-methyl-1-(3-chloropropyl)-piperazine, 1.1 g. of magnesium and 4.8 g. of 6-chloro-9,10-dihydro-4H-benzo[4,5]cyclohepta[1,2 - b]thiophen - 4 - one in 30 cc. of tetrahydrofuran in a manner analogous to that described in Example 1(a). Melting point 178–179° from ethanol.

(b) 6 - chloro - 4 - [3 - (4 - methyl - piperazino) - propylidene]9,10 - dihydro - 4H - benzo[4,5]cyclohepta[1,2-b]thiophene.—This compound is obtained by heating 3.5 g. of the compound obtained in (a) above in a mixture of 50 cc. of glacial acetic acid and 20 cc. of concentrated hydrochloric acid in a manner analogous to that described in Example 1(b).

Dihydrochloride

This is produced by the addition of the calculated quantity of ethanolic hydrochloric acid to an ethanolic solution of the base. Melting point 260–262° (decomposition) from ethanol.

EXAMPLE 20

7 - chloro - 4 - [2 - (1 - methyl - 2 - piperidyl) - ethyl]-9,10 - dihydro - 4H - benzo[4,5]cyclohepta[1,2-b]thiophen-4-ol is obtained from 7.43 g. of 2-(1-methyl-2-piperidyl)-1-chloroethane, 1.1 g. of magnesium and 4.97 g. of 7 - chloro - 9,10 - dihydro - 4H - benzo[4,5]cyclohepta[1,2-b]thiophen-4-one in 30 cc. of absolute tetrahydrofuran in a manner analogous to that described in Example 1(a) and (b). By heating with a mixture of 76 g. of glacial acetic acid and 31 cc. of concentrated hydrochloric acid one mol of water is split off, whereby 7-chloro-4-[2 - (1 - methyl - 2 - piperidyl) - ethylidene] - 9,10 - dihydro - 4H - benzo[4,5]cyclohepta[1,2-b]thiophene is obtained. Melting point 126–127° from ethanol.

The 7-chloro - 9,10 - dihydro-4H-benzo[4,5]cyclohepta[1,2-b]thiophen-4-one used as starting material is produced as follows:

3-bromo-5-chloro-phthalide

A mixture of 72.5 g. of 5-chloro-phthalide, 76.6 g. N-bromosuccinimide and 0.25 g. of dibenzoyl peroxide is heated to the boil whilst stirring for 22 hours in 4300 cc. of absolute carbon tetrachloride. After cooling the reaction mixture filtration is effected and the filtrate is evaporated to dryness at 50° and reduced pressure. After recrystallization from acetone pure 3-bromo-5-chloro-phthalide, having a melting point of 108–110°, is obtained from the crystalline residue.

4-chloro-phthalaldehydic acid 59.1 g. of 3-bromo-5-chloro-phthalide are suspended in 600 cc. of water and the suspension is heated to 100° for 8 hours whilst stirring well. Cooling is then effected to 0°, the 4-chloro-phthalaldehydic acid is filtered off and washed with ice cold water until neutral. Pure 4-chloro-phthaldehydic acid, having a melting point of 184–186°, is obtained without further purification.

4-chloro-4-[2-(2-thienyl)-vinyl]benzoic acid

A solution of the mixture of 36.9 g. of 4-chloro-phthaldehydic acid and 47.0 g. of 2-thenyldiethyl-phosphonate in 130 cc. of dimethyl formamide is added dropwise whilst stirring well to a suspension of dry sodium methylate produced from 10.4 g. of sodium in 110 cc. of dimethyl formamide. The dropwise addition is effected at such a rate that the internal temperature always remains at 35–40°. Stirring is subsequently effected for 15 minutes at room temperature and the mixture is then poured into 6000 cc. of water. The alkaline aqueous solution is carefully acidified to a pH value of 3 with dilute hydrochloric acid. The precipitated substance is filtered off and after recrystallization of the crude product from ethanol pure 4-chloro-2-[2-(2-thienyl)-vinyl]-benzoic acid, having a melting point of 198–200°, is obtained.

4-chloro-2-[2-(2-thienyl)-ethyl]-benzoic acid

A suspension of 18.5 g. of 4-chloro-2-[2-(2-thienyl)-vinyl]-benzoic acid in 350 cc. of 95% ethanol is added at once at 50° to sodium amalgam produced from 7.0 g. of sodium and 520 g. of mercury. Stirring is then effected at room temperature for 3 hours and the ethanolic solution of the reaction product is then separated from the mercury. Evaporation to dryness is effected at 60° and reduced pressure and the residue is then dissolved in 1000 cc. of water. The solution is filtered and the filtrate acidified with concentrated hydrochloric acid. The reaction product is extracted with ether, the extracts are dried over sodium sulphate and the solvent is evaporated at 30° and reduced pressure. The crystalline residue is recrystallized from ethanol and yields pure 4-chloro-2-[2-(2-thienyl)-ethyl]-benzoic acid having a melting point of 127–128°.

7-chloro-9,10-dihydro-4H-benzo[4,5]cyclohepta[1,2-b] thiophen-4-one 104 g. of phosphorus pentoxide and 74 cc. of 80% phosphoric acid are mixed and the mixture is heated to 140° for 30 minutes whilst stirring. Subsequently 25.7 g. of 4-chloro-2-[2-(2-thienyl)-ethyl]-benzoic acid are added at the same temperature and stirring is effected for a further 3 hours at 140°. The reaction mixture is then poured into 1400 cc. of water whilst hot. Extraction is effected a number of times with ether, the combined extracts are dried over sodium sulphate and the solvent is evaporated at 30° and reduced pressure. The viscous residue is distilled in a hot air bath at a strongly reduced pressure. Boiling point 170–180°/0.1 mm. Hg. The distillate is made to crystallize from a mixture of ether and petroleum ether. Pure 7-chloro-9,10-dihydro - 4H - benzo[4,5]cyclohepta[1,2-b]thiophen-4-one melts at 63–64°.

EXAMPLE 21

(a) 7-chloro-4-(3 - dimethylamino - propyl) - 9,10 - dihydro - 4H - benzo[4,5]cyclohepta[1,2 - b]thiophen-4-ol.—This compound is obtained from 9.0 g. of 3-dimethylamino-propyl chloride, 1.71 g. of magnesium and 8.0 g. of 7-chloro - 9,10 - dihydro-4H-benzo[4,5]cyclohepta[1,2-b]thiophen-4-one in 50 cc. of absolute tetrahydrofuran in manner analogous to Example 1(a). Melting point 140–142° from ethanol.

(b) 7 - chloro - 4 - (3 - dimethylamino-propylidene)-9,10 - dihydro - 4H - benzo[4,5]cyclohepta[1,2-b]thiophene.—This compound is obtained in manner analogous to Example 1(b) from 9–0 g. of the compound produced in (a) above by heating in 90 cc. of glacial acetic acid and 36 cc. of concentrated hydrochloric acid. Boiling point 140–150°/0.1 mm. Hg.

Hydrochloride

The base is dissolved in ethanol and the calculated amount of ethanolic hydrochloric acid is added to the solution. Evaporation to dryness is effected and crystallization from acetone/ether. Melting point 200–201° (decomposition).

EXAMPLE 22

7-chloro-4-[3 - (4 - methyl - piperazino) - propyl]-9,10-dihydro - 4H - benzo[4,5]cyclohepta[1,2-b]thiophen - 4 - ol is obtained from 13.7 g. of 4-methyl-1-(3-chloropropyl)-piperazine, 1.78 g. of magnesium and 8.4 g. of 7-chloro - 9,10 - dihydro - 4H - benzo[4,5]cyclohepta[1,2-b]thiophen-4-one in 50 cc. of absolute tetrahydrofuran in a manner analogous to that described in Example 1(a). By heating with a mixture of 112 cc. of glacial acetic acid and 45 cc. of concentrated hydrochloric acid one mol of water is split off, whereby 7-chloro-4-[3-(4-methyl-piperazino)-propylidene]-9,10-dihydro - 4H - benzo[4,5]cyclohepta[1,2-b]thiophene is obtained.

Dihydrochloride

The calculated amount of ethanolic hydrochloric acid is added to an ethanolic solution of the base. Melting point 226–231° (decomposition).

EXAMPLE 23

(a) 7-chloro-4-(3-dimethylamino-propyl) - 4H - benzo[4,5]cyclohepta[1,2 b]thiophen-4-ol.—A solution of 9.3 g. of 7-chloro-4H-benzo[4,5]cyclohepta[1,2 - b]thiopen-4-one in 155 cc. of absolute tetrahydrofuran is added dropwise whilst stirring to a Grignard compound produced from 10.55 g. of 3-dimethyl-amino-propyl chloride and 1.99 g. of activated magnesium in 55 cc. of absolute tetrahydrofuran. Stirring is subsequently effected at 90° for 20 minutes and the reaction mixture is then poured into a solution of 31 g. of ammonium chloride in 210 cc. of water. Extraction is effected a number of times with ether, the combined extracts are dried over sodium sulphate and the reaction mixture is evaporated to dryness at 15 mm. Hg. The viscous residue crystallizes after rubbing with ether. After recrystallizing twice from ethanol the desired compound, having a melting point of 143–145°, is obtained.

(b) 7 - chloro-4-(3 - dimethylamino - propylidene)-4H-benzo[4,5]cyclohepta[1,2-b]thiophene.— A solution of 6.6 g. of 7-chloro-4-(3-dimethyl-amino-propyl)-4H-benzo[4,5]cyclohepta[1,2-b]thiophen-4-ol is heated to the boil at reflux for one hour together with a mixture of 66 cc. of glacial acetic acid and 26.4 cc. of concentrated hydrochloric acid and concentration to a small volume is then effected at 15 mm. Hg. The mixture is made alkaline with 2 N sodium hydroxide solution and extracted a number of times with chloroform. The combined extracts are washed with water until neutral, dried over sodium sulphate and then evaporated to dryness at 15 mm. Hg. Crude 7-chloro-4-(3-dimethylamino - propylidene) - 4H - benzo[4,5]cyclohepta[1,2-b]thiophene is distilled in a high vacuum, whereby the compound distils over at an air bath temperature of 180–200°.

Phosphate

The calculated amount of 1 N phosphoric acid is added to a solution of the pure base in acetone. Evaporation to dryness is subsequently effected and the residue is crystallized from a mixture of ethanol and acetone. The pure phosphate melts at 187–192° (decomposition).

The 7-chloro-4H-benzo[4,5]cyclohepta[1,2-b]thiophen-4-one used as starting material is obtained as follows: A mixture of 24.8 g. of 7-chloro-9,10-dihydro-4H-benzo[4,5]cyclohepta[1,2-b]thiophen-4-one (production described at the end of Example 3), 17.8 g. of N-bromo-succinimide and 50 mg. of dibenzoyl peroxide in 2500 cc. of absolute carbon tetrachloride is heated to 100° for 22 hours whilst stirring. The reaction mixture is left to cool, filtration is effected and the filtrate is evaporated to dryness at 50° and reduced pressure. The residue is dissolved in 250 cc. of triethyl amine and the solution is heated to the boil at reflux for 2 hours. The reaction mixture is then evaporated to dryness at reduced pressure and the residue is taken up in 200 cc. of 2 N hydrochloric acid. Extraction is effected a number of times with methylene chloride, the combined extracts are washed with water until neutral, dried over sodium sulphate and evaporated to dryness. For purposes of purification the crude product is recrystallized twice from acetone and once from ethanol. Pure 7-chloro-4H-benzo[4,5]cyclohepta[1,2-b]thiophen-4-one melts at 141–142°.

EXAMPLE 24

6-chloro-4-[2-(1-methyl-2-piperidyl)-ethylidene]-9,10-dihydro-4H-benzo[4,5]cyclohepta[1,2-b]thiophene 1.1 g. of magnesium which has been activated with iodine is covered with a layer of tetrahydrofuran and a few drops of ethylene bromide are added. After the reaction has commenced a solution of 7.2 g. of 2-[1-methyl-piperidyl-(2)]-ethyl chloride in 10 cc. of tetrahydrofuran is added dropwise at such a rate that the solvent boils and the mixture is heated to the boil for two hours. A solution of 4.8 g. of 6-chloro-9,10-dihydro-4H-benzo[4,5]cyclohepta[1,2-b]thiophen-4-one in 10 cc. of tetrahydrofuran is then added dropwise during the course of 15 minutes and heating to the boil is effected for a further 30 minutes whilst stirring. After cooling the reaction mixture is poured into a solution of 30 g. of ammonium chloride in 150 cc. of water, diluted with 150 cc. of methylene chloride and the entire material is filtered through highly purified diatomaceous earth. After separating the organic phase the aqueous portion is extracted twice more with methylene chloride, the combined methylene chloride extracts are washed with water, dried over magnesium sulphate and the solvent is evaporated at 15 mm. Hg.

The crude 6-chloro-4-[2-(1-methyl-2-piperidyl)-ethyl]-9,10-dihydro-4H-benzo[4,5]cyclohepta[1,2-b]thiophen-4-ol is dissolved in 18% hydrochloric acid, the solution is washed twice with ether, made alkaline with sodium carbonate whilst cooling and extracted three times with methylene chloride. The combined methylene chloride solutions are then dried over magnesium sulphate and the solvent is evaporated at 15 mm. Hg. The oily residue is dissolved in isopropanol, the calculated amount of salicylic acid in isopropanol is added thereto and the solution is left to stand at 0° for 24 hours. The precipitate is filtered off and recrystallized from isopropanol. 6-chloro-4-[2-(1-methyl-2-piperidyl) - ethylidene] - 9,10-dihydro - 4H - benzo[4,5]cyclohepta[1,2 - b]thiophene salicylate has a melting point of 171–172.5°.

EXAMPLE 25

(a) 6 - chloro - 4 - (3 - dimethylamino - 2 - methyl-propyl) - 9,10 - dihydro - 4H - benzo[4,5]cyclohepta[1,2-b]thiophen - 4 - ol.—0.82 g. of magnesium which have been activated with iodine are covered with a layer of tetrahydrofuran and a few drops of ethylene bromide are added. After the reaction has commenced a solution of 4.4 g. of 3-dimethylamino-2-methyl-propyl chloride in 10 cc. of tetrahydrofuran is added dropwise at such a rate that the solvent boils and subsequently heating to the boil is effected for a further 2 hours. A solution of 4.5 g. of 6 - chloro - 9,10 - dihydro - 4H - benzo[4,5]cyclohepta[1,2-b]thiophen-4-one in 15 cc. of tetrahydrofuran is then added dropwise at 20° during the course of 5 minutes and heating to the boil is effected for a further 30 minutes whilst stirring. After cooling the reaction mixture is poured into 200 cc. of a 20% ammonium chloride solution and the aqueous solution is shaken out three times with ether. The combined ether extracts are washed twice with water, dried over sodium sulphate and the solvent is evaporated at 15 mm. Hg. The oily residue is crystallized from hexane. Melting point 149–151°.

(b) 6 - chloro - 4 - (3 - dimethylamino - 2 - methyl-propylidene - 9,10 - dihydro - 4H - benzo[4,5]cyclohepta[1,2-b]thiophene.—5.0 g. of 6 - chloro - 4 - (3-dimethylamino-2-methylpropyl) - 9,10 - dihydro - 4H - benzo[4,5]cyclohepta[1,2-b]thiophen-4-ol are dissolved in 50 cc. of glacial acetic acid, 20 cc. of concentrated hydrochloric acid are added and heating to the boil is effected for 30 minutes. The solvent is then evaporated at 15 mm. Hg, the oily residue is dried and dissolved in 3 cc. of acetone. After a few minutes the hydrochloride precipitates. It is filtered off and recrystallized from ethanol/ether. Melting point 225–226°.

EXAMPLE 26

(a) 6 - chloro - 4 - (3 - dimethylamino - 2 - methyl-propyl) - 4H - benzo[4,5]cyclohepta[1,2-b]thiophen - 4 - ol.—This compound is produced from 0.82 g. of magnesium, 4.4 g. of 3-dimethylamino-2-methyl-propyl chloride in tetrahydrofuran and 4.5 g. of 6-chloro-4H-benzo[4,5]cyclohepta[1,2-b]thiophen-4-one in a manner analogous to that described in Example 8(a). Melting point 188–190° from hexane.

(b) 6 - chloro - 4 - (3 - dimethylamino - 2 - methyl-propylidene) - 4H - benzo[4,5]cyclohepta[1,2 - b]thiophene.—A solution of 5.0 g. of 6-chloro-4-(3-dimethylamino - 2 - methyl-propyl) - 4H - benzo[4,5]cyclohepta[1,2-b]thiophen-4-ol in 50 cc. of isopropanol, 50 cc. of ethanol and 10 cc. of 6 N isopropanolic hydrochloric acid is stirred at 80° for 30 minutes. The solvent is evaporated at 15 mm. Hg and the residue dissolved in 3 cc. of acetone. After standing the hydrochloride precipitates; it is filtered off and recrystallized from ethanol/ether. Melting point 241–243°. The 6-chloro-4H-benzo[4,5]cyclohepta[1,2-b]thiophen-4-one used as the starting material is obtained from the 6-chloro-9,10-dihydro-4H-benzo[4,5]cyclohepta[1,2-b]thiophen - 4 - one (Example 1) in a manner analogous to that described for the corresponding 7-chloro derivative in Example 6 and has a melting point of 152–153° when recrystallized from benzene.

EXAMPLE 27

(a) 6-chloro - 4 - (3-dimethylamino-propyl)-4H-benzo[4,5]cyclohepta[1,2-b]thiophen-4-ol.—This compound is produced from 1.0 g. of magnesium, 4.5 g. of 3-dimethylamino-propyl chloride in tetrahydrofuran and 3.8 g. of 6 - chloro - 4H - benzo[4,5]cyclohepta[1,2-b]thiophen-4-one in a manner analogous to that described in Example 8(a). Melting point 164–165° from ethanol.

(b) 6 - chloro - 4 - (3 - dimethylamino-propylidene)-4H - benzo[4,5]cyclohepta[1,2-b]thiophene.—This compound is obtained from 8.0 g. of 6-chloro-4-(3-dimethylamino-propyl) - 4H - benzo[4,5]cyclohepta[1,2-b]thiophen-4-ol, 10 cc. of isopropanol and 10 cc. of 6 N isopropanolic hydrochloric acid in a manner analogous to that described in Example 9(b). The hydrochloride melts at 183–186° (decomposition) from isopropanol. The hydrogen maleate melts at 115–118° from ethanol/ether.

EXAMPLE 28

(a) 6 - chloro-4-[3-(4-methyl-piperazino)-propyl]-4H-benzo[4,5]cyclohepta[1,2-b]thiophen - 4-ol.—This compound is produced from 1.1 g. of magnesium, 7.9 g. of 3-(1-methyl-piperazino)-propyl chloride in tetrahydrofuran and 4.8 g. of 6-chloro-4H-benzo[4,5]cyclohepta[1,2-b]thiophen-4-one in a manner analogous to that described in Example 8(a). Melting point 136.5–137.5° from 95% ethanol.

(b) 6-chloro-4-[3-(4-methyl-piperazino)-propylidene]-4H-benzo[4,5]cyclohepta[1,2-b]thiophene.—4.0 g. of 6-chloro - 4-[3-(4-methyl-piperazino)-propyl]-4H - benzo[4,5]cyclohepta[1,2-b]thiophen-4-ol are dissolved in 10 cc. of hot absolute ethanol and 5 cc. of 6 N isopropanolic hydrogen chloride solution are added to the resulting solution, whereby the hydrochloride precipitates immediately. It is filtered off and crystallized from methanol/ethanol. Melting point 215–220° (decomposition).

EXAMPLE 29

(a) 6-chloro - 4-[3 - (4 - ethoxycarbonyl-piperazino)-propylidene]-9,10 - dihydro - 4H - benzo[4,5]cyclohepta[1,2-b]thiophene.—A solution of 13.0 g. of 6-chloro-4-[3-(4-methyl-piperazino)-propylidene]-9,10 - dihydro-4H-benzo[4,5]cyclohepta[1,2-b]thiophene (produced in accordance with Example 2) in 67 cc. of absolute benzene is added dropwise whilst stirring at room temperature to a solution of 11.2 g. of chloroformic acid ethyl ester in 67 cc. of absolute benzene. The reaction mixture is subsequently heated to 100° for 2 hours. After cooling to room temperature the reaction mixture is diluted with 120 cc. of benzene and extracted three times, each time with 100 cc. of water. The benzene solution is then dried over sodium sulphate and evaporated to dryness at 50° and a pressure of 15 mm. Hg. The residue, 6-chloro-4-[3-(4-ethoxycarbonyl-piperazino)-propylidene]-9,10 - dihydro-4H-benzo[4,5]cyclohepta[1,2-b]thiophene, is worked up further as such without purification.

(b) 6-chloro-4-[3-(piperazino)-propylidene]-9,10 - dihydro - 4H - benzo[4,5]cyclohepta[1,2-b]thiophene.—A solution of 6.6 g. of potassium hydroxide and 10.0 g. of 6-chloro - 4-[3 - (4 - ethoxycarbonyl-piperazino)-propylidene]-9,10-dihydro - 4H - benzo[4,5]cyclohepta[1,2-b]thiophene in 80 cc. of absolute n-butanol is heated to the boil at reflux in an atmosphere of nitrogen for 7 hours. The reaction mixture is then evaporated to dryness at 15 mm. Hg and the residue is taken up in 120 cc. of water. The pH value of the resulting aqueous solution is then adjusted to 2 with concentrated hydrochloric acid whilst cooling with ice and shaken out three times with ether. The aqueous acid solution is made alkaline with ammonium hydroxide and the liberated base is extracted three times with methylene chloride. The combined extracts are dried over sodium sulphate, filtration is effected through active charcoal and the filtrate is evaporated to dryness at 50° and 15 mm. Hg. The residue is distilled in a hot air bath in a high vacuum, whereby 6-chloro-4-[3-(piperazino)-propylidene]-9,10 - dihydro-4H - benzo[4,5]cyclohepta[1,2-b]thiophene distils over at an air bath temperature of 220–235°/0.1 mm. Hg.

Dihydrochloride

The calculated amount of ethanolic hydrochloric acid is added to a solution of the distilled base in acetone, evaporation to dryness is effected and the residue is recrystallized from isopropanol/ether. The dihydrochloride melts at 254° (decomposition).

EXAMPLE 30

6-chloro-4 - (3 - [4 - (β-hydroxyethyl)-piperazino]propylidene) - 9,10 - dihydro - 4H - benzo[4,5]cyclohepta[1,2-b]thiophene A solution of 6.5 g. of 6-chloro-4-[3-(piperazino)-propylidene]-9,10 - dihydro - 4H - benzo[4,5]cyclohepta[1,2-b]thiophene (produced in accordance with Example 12) and 1.7 g. of ethylene oxide in 40 cc. of absolute ethanol is heated to 100° for one hour in a bomb tube. The contents of the tube are then evaporated to dryness at 15 mm. Hg and the residue is dissolved in acetone. The calculated amount of ethanolic hydrochloric acid is added to this solution, boiling is effected after the addition of a small amount of ethanol, the solution is filtered through active charcoal and the filtrate is evaporated. The solid residue is recrystallized from isopropanol. 6-chloro-4-{3 - [4-(β - hydroxyethyl)-piperazino]-propylidene}-9,10-dihydro - 4H - benzo[4,5]cyclohepta[1,2-b]thiophene dihydrochloride melts at 195–198° (decomposition).

EXAMPLE 31

(a) 6-bromo-4-(3-dimethylamino-propyl) - 9,10 - dihydro - 4H - benzo[4,5]cyclohepta[1,2 - b]thiophen - 4-ol.—1.1 g. of magnesium which has been activated with iodine is covered with 10 cc. of anhydrous tetrahydrofuran and a few drops of ethylene bromide are added. After the reaction has commenced a solution of 5.4 g. of 3-dimethylamino-propyl chloride in 10 cc. of tetrahydrofuran is added dropwise at such a rate that the solvent boils and the mixture is subsequently heated to the boil for one hour. A solution of 5.4 g. of 6-bromo-9,10 - dihydro - 4H - benzo[4,5]cyclohepta[1,2 - b]thiophen-4-one in 15 cc. of tetrahydrofuran is then added dropwise at 20° whilst cooling during the course of 15 minutes and the mixture is heated for a further 10 minutes whilst stirring. The cooled reaction mixture is then poured into 200 cc. of a 20% ammonium chloride solution, shaken out a number of times with methylene chloride and the combined methylene chloride solutions are washed with water and dried over magnesium sulphate. After evaporating the solvent the oily residue is crystallized from ethanol. After recrystallization from ethanol 6-bromo - 4 - (3 - dimethylamino - propyl) - 9,10 - dihydro-4H - benzo[4,5]cyclohepta[1,2 - b]thiophen - 4 - ol melts at 128–129°.

(b) 6-bromo - 4 - (3 - dimethylamino - propylidene)-9,10-dihydro - 4H - benzo[4,5]cyclohepta[1,2 - b]thiophene.—5 cc. of 5 N isopropanolic hydrochloric acid are added to a solution of 4.2 g. of 6-bromo-4-(3-dimethylamino - propyl) - 9,10 - dihydro - 4H - benzo[4,5]cyclohepta[1,2 - b]thiophen - 4 - ol in 10 cc. of absolute ethanol and the solution is heated on a water bath for 30 minutes. After cooling 2 cc. of ether are added and the solution is left to stand. The precipitated hydrochloride is filtered off and recrystallized from ethanol/ether whilst treating with animal charcoal. The hydrochloride melts at 246–248° (decomposition).

The 6-bromo - 9,10 - dihydro - 4H - benzo[4,5]cyclohepa[1,2-b]thiophen-4-one used as starting material is produced as follows:

5-bromo-phthalaldehydic acid

A mixture of 1000.0 g. of 6-bromophthalide, 81.0 g. of N-bromosuccinimide and 0.2 g. of dibenzoyl peroxide in 6000 cc. of anhydrous carbon tetrachloride is heated to the boil for 22 hours whilst stirring. The hot solution is filtered and the solvent is evaporated at 15 mm. Hg. The crude 3,6-dibromophthalide is then heated at reflux for 4 hours together with 2500 cc. of water, the resulting hot solution is filtered through highly purified diatomaceous earth, the filtrate is cooled and the precipitated acid filtered off. After concentrating the mother liquor to 500 cc. a further portion of acid is separated. After drying in a high vacuum at 60° 5-bromo-phthalaldehydic acid melts at 136–138°.

5-bromo-2-[2-(2-thienyl)-vinyl]-benzoic acid 1 to 2 cc. of a solution of 52.0 g. of 5-bromo-phthalaldehydic acid and 53.4 g. of 2-thenyldiethylphosphonate in 80 cc. of dimethyl formamide are added dropwise to a suspension of 27.4 g. of sodium methylate in 100 cc. of dimethyl formamide, whereby the temperature of the mixture rises to 35°. The flask is then placed on an ice bath and the remainder of the solution of 5-bromo-phthalaldehydic acid and 2-thenyldiethyl-phosphonate is added as rapidly as possible so that the internal temperature remains at 35–40°. The mixture is then stirred at room temperature for a further 30 minutes. 2500 cc. of water are added to the reaction mixture at 10–15° whilst cooling well and the aqueous alkaline solution is shaken out once with 150 cc. of benzene. The pH value of the resulting aqueous solution is then carefully adjusted to 3.5 with a 2 N hydrochloric acid at 5–10°. After a number of hours the precipitated acid is filtered off and recrystallized from benzene/ethanol. Melting point 174–175°.

5-bromo-2-[2-(2-thienyl)-ethyl]-benzoic acid

A solution of 40.0 g. of 5-bromo-2-[β-(2-thienyl)-vinyl]-benzoic acid in 800 cc. of glacial acetic acid is heated to 75°. 40.0 g. of red phosphorus and 220 cc. of 56% hydriodic acid are added at this temperature and heating to the boil is effected for 10 minutes whilst stirring. The hot reaction mixture is then filtered through highly purified diatomaceous earth and the filtrate is slowly poured into 4000 cc. of water and ice. The aqueous portion is decanted and the viscous residue is rubbed with fresh water. The solid product is then separated and dissolved in 600 cc. of benzene, the benzene solution is dried over sodium sulphate and the filtrate is concentrated and cooled. After drying at 15 mm. Hg and a temperature of 80° the precipitated acid melts at 122–124°.

6-bromo-9,10-dihydro-4H-benzo[4,5]cyclohepta[1,2-b]thiophen-4-one

A mixture of 100 cc. of 84% phosphoric acid and 140 g. of phosphorus pentoxide is first stirred at 125–130° for 30 minutes. 30 g. of 5-bromo-2-[β-(2-thienyl)-ethyl]-benzoic acid are then added portionwise at the same temperature during the course of 30 minutes. The mixture is then stirred for a further 45 minutes at the same temperature, cooled to 70° and poured into 1500 cc. of ice water whilst stirring. The reaction product is then extraced three times with methylene chloride, the combined methylene chloride extracts are washed three times with 2 N sodium carbonate solution and twice with water, dried over sodium carbonate and the solvent evaporated at 15 mm. Hg. The oily residue is distilled in a high vacuum, whereby 6-bromo-9,10-dihydro-4H - benzo[4,5] cyclohepta[1,2-b]thiophen-4-one distils over at 200–220°/2–3 mm. Hg.

The brown distillate is then dissolved in ether, the ethereal solution is diluted with 30 cc. of ethanol, filtered through active charcoal and the ether is evaporated. The ethanolic solution is left to cool slowly and the greenish ketone, having a melting point of 88–90°, is filterered off. After recrystallization from ethanol the ketone melts at 93–94.5°.

EXAMPLE 32

(a) 6 - methoxy - 4 - (3-dimethylamino-propyl)-9,10-dihydro - 4H - benzo[4,5]cyclohepta[1,2-b]thiophen-4-ol 1.9 g. of magnesium which have been activated with iodine are covered with a layer of 10 cc. of absolute tetrahydrofuran and a few drops of ethylene bromide are added. After the reaction has commenced a solution of 8.7 g. of 3-dimethylamino-propyl chloride in 10 cc. of tetrahydrofuran is added dropwise at such a rate that the solvent boils and the mixture is subsequently heated to the boil for one hour. A solution of 7.5 g. of 6-methoxy-9,10 - dihydro - 4H - benzo[4,5]cyclohepta[1,2 - b]thiophen-4-one in 15 cc. of tetrahydrofuran is then added dropwise at 20° whilst cooling during the course of 15 minutes and the mixture is heated for a further 30 minutes. The cooled reaction mixture is then poured into 200 cc. of a 20% ammonium chloride solution, shaken out a number of times with methylene chloride and the combined methylene chloride extracts are washed with water and dried over magnesium sulphate. After evaporating the solvent the oily residue is crystallized from ether whilst treating with animal charcoal. Melting point 125–126°.

(b) 6 - methoxy - 4 - (3-dimethylamino-propylidene)-9,10 - dihydro - 4H - benzo[4,5]cyclohepta[1,2 - b]thiophene.—5.0 g. of 6-methoxy - 4 - (3 - dimethylamino-propyl) - 9,10 - dihydro - 4H - benzo[4,5]cyclohepta[1,2-b]thiopen-4-ol are dissolved in 75 cc. of glacial acetic acid and 30 cc. of concentrated hydrochloric acid are added to the resulting solution. The solution is then left to stand at room temperature for 5 hours whilst shaking frequently. The reation mixture is then poured into 250 cc. of ice water and the solution is made strongly alkaline with sodium hydroxide solution whilst cooling. The aqueous solution is then shaken out three times with ether, the ethereal extract is dried over magnesium sulphate and evaporated at 50°.

Hydrochloride

The calculated amount of isopropanolic hydrogen chloride is added to a solution of the crude base in isopropanol, dilution is effected with a little ether and the solution is left to stand. The precipitated hydrochloride is filtered off and recrystallized twice from isopropanol. Melting point 213–215° (decomposition).

The 6 - methoxy - 9,10 - dihydro - 4H - benzo[4,5] cyclohepta[1,2-b]thiophen-4-one used as starting material is produced as follows:

5-methoxy-phthalaldehydic acid

A mixture of 20.5 g. of 6-methoxyphthalide, 20.5 g. of N-bromosuccinimide and 0.06 g. of dibenzoyl peroxide in 1000 cc. of anhydrous carbon tetrachloride is heated to the boil for 22 hours whilst stirring. The hot solution is filtered off and the solvent is evaporated at 15 mm. Hg. The crude 3-bromo-6-methoxyphthalide is subsequently heated at reflux for 4 hours with 500 cc. of water, the resulting hot solution is filtered through highly purified diatomaceous earth and the filtrate is cooled. The precipitated acid is filtered off and the mother liquor is concentrated to half its volume, whereupon a further portion of acid is filtered off. After drying in a high vacuum at 60° the acid melts at 142–143°.

5-methoxy-2-[2-(2-thienyl)-vinyl]-benzoic acid 1 to 2 cc. of a solution of 40.0 g. of 5-methoxyphthalaldehydic acid and 52.0 g. of 2-thenyl-diethylphosphonate in 80 cc. of dimethyl formamide are added dropwise to a suspension of 26.6 g. of sodium methylate in 80 cc. of dimethyl formamide, whereby the temperature of the mixture rises to 30°. The flask is then placed on an ice bath and the remainder of the solution of 5-methoxyphthalaldehydic acid and 2-thenyl-diethyl phosphonate in 80 cc. of dimethyl formamide is added dropwise as rapidly as possible so that the internal temperature remains at 30–35°. The mixture is then stirred for a further 30 minutes at room temperature. 2500 cc. of water are added to the reaction solution at 10–15° whilst cooling well and the aqueous solution is shaken out with 150 cc. of benzene. The pH value of the resulting aqueous solution is then carefully adjusted to 3 to 4 with 2 N hydrochloric acid at 5–10°. After 2 to 3 hours the precipitated acid is filtered off and recrystallized from benzene. Melting point 170–171°.

5-methoxy-2-[2-(2-thienyl)-ethyl]-benzoic acid 19.0 g. of sodium are melted under anhydrous toluene, whereupon 1250 g. of pure mercury are added dropwise whilst stirring frequently at such a rate that the toluene boils. The mixture is then heated to 120–140° whilst stirring and as soon as all the toluene is evaporated cooling is effected to 260°. A solution of 49.0 g. of 5-methoxy-2-[2-(2-thienyl)-vinyl]-benzoic acid in 400 cc. of 95% ethanol is poured into the homogeneous amalgam and the mixture is shaken vigorously for 90 minutes. The mercury is then separated, washed three times with ethanol and the combined ethanolic solutions are diluted with 3000 cc. of water. The solution is filtered through highly purified diatomaceous earth and its pH value is slowly adjusted to 1 with 2 N hydrochloric acid whilst stirring. After a number of hours the precipitated acid is filtered off and crystallized from chloroform/hexane. Melting point 120–122°.

6-methoxy-9,10-dihydro-4H-benzo[4,5]cyclohepta[1,2-b]thiophen-4-one

A mixture of 80 cc. of 84% phosphoric acid and 112 g. of phosphorus pentoxide is first stirred at 125–130° for 30 minutes. The resulting polyphosphoric acid is then cooled to 90° and covered with a layer of 250 cc. of anhydrous toluene. A solution of 22.0 g. of 5-methoxy-2-[2-(2-thienyl)-ethyl]-benzoic acid is 100 cc. of toluene is then added dropwise at the same temperature during the course of 30 minutes whilst introducing nitrogen and the mixture is stirred for 8 hours longer. The reaction mixture is then poured into 1000 cc. of water, the toluene layer is separated and the aqueous phase is shaken out a further three times with toluene. The combined organic solutions are then washed three times with 2 N sodium carbonate solution and twice with water dried over magnesium sulphate and the solvent is evaporated at reduced pressure. The residue is distilled in a high vacuum, whereby 6-methoxy-9,10-dihydro-4H-benzo[4,5]cyclohepta[1,2-b]thiophen-4-one distills at 165–180°/0.1–0.5 mm. Hg. It is worked up further as such without additional purification.

What is claimed is:
1. A compound of the formula:

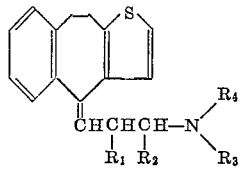

wherein each of $R_1$ and $R_2$ represents hydrogen or lower alkyl and each of $R_3$ and $R_4$ represents lower alkyl, or a pharmaceutically acceptable acid addition salt thereof.

2. A compound of the formula:

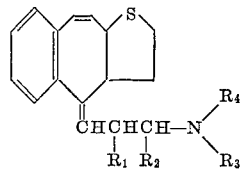

wherein each of $R_1$ and $R_2$ represents hydrogen or methyl and each of $R_3$ and $R_4$ represents lower alkyl, or a pharmaceutically acceptable acid addition salt thereof.

3. The compound according to claim 1, which is 4-(3'-dimethylamino-propylidene) - 9,10 - dihydro-4H-benzo[4,5]cyclohepta[1,2-b]thiophene.

4. The compound according to claim 1, which is 4-(3'-diethylamino-propylidene) - 9,10 - dihydro-4H-benzo[4,5]cyclohepta[1,2-b]thiophene.

5. The compound according to claim 1, which is 4-(3'-dimethylamino - 2' - methyl-propylidene)-9,10-dihydro-4H-benzo-[4,5]cyclohepta[1,2-b]thiophene.

6. The compound according to claim 2, which is 4-(3-dimethylamino-propylidene) - 4H - benzo[4,5]cyclohepta[1,2-b]thiophene.

References Cited
UNITED STATES PATENTS 3,073,847    1/1963    Doebel et al. ____ 260—240 XR
3,306,897    2/1967    Renz et al. _____ 260—240

JOHN D. RANDOLPH, Primary Examiner

U.S. Cl. X.R.

260—240, 247.1, 268, 293.4, 326.5, 326.81, 332.2, 343.3, 515, 999